(12) United States Patent
Hiramitsu et al.

(10) Patent No.: US 9,984,790 B2
(45) Date of Patent: May 29, 2018

(54) SHEATHED WIRE HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hiroomi Hiramitsu, Mie (JP); Ryouya Okamoto, Mie (JP); Hiroshi Shimizu, Mie (JP); Hiroki Hirai, Mie (JP); Tetsuji Tanaka, Mie (JP); Hitoshi Takeda, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/548,482

(22) PCT Filed: Jan. 22, 2016

(86) PCT No.: PCT/JP2016/051796
§ 371 (c)(1),
(2) Date: Aug. 3, 2017

(87) PCT Pub. No.: WO2016/129358
PCT Pub. Date: Aug. 18, 2016

(65) Prior Publication Data
US 2018/0005726 A1    Jan. 4, 2018

(30) Foreign Application Priority Data

Feb. 12, 2015    (JP) .................................. 2015-025414
Mar. 31, 2015    (JP) .................................. 2015-071163

(51) Int. Cl.
*H01R 13/58*    (2006.01)
*H01B 3/50*    (2006.01)
(Continued)

(52) U.S. Cl.
CPC .......... *H01B 3/50* (2013.01); *B60R 16/0215* (2013.01); *H01B 3/308* (2013.01); *H01B 7/0045* (2013.01);
(Continued)

(58) Field of Classification Search
CPC .................................................... H01R 13/516
See application file for complete search history.

(56) References Cited

U.S. PATENT DOCUMENTS 4,662,700 A  *  5/1987  Markham ............ H01R 12/775
                                                439/607.52
4,857,012 A  *  8/1989  Yard .................... H01R 13/516
                                                439/445
(Continued)

FOREIGN PATENT DOCUMENTS

FI    WO9608856    *    3/1996    .......... H01R 13/516
JP    H09107614 A         4/1997
(Continued)

OTHER PUBLICATIONS

International Search Report for Application No. PCT/JP2016/051796 dated Apr. 19, 2016, 6 pages.
(Continued)

*Primary Examiner* — Tho D Ta
(74) *Attorney, Agent, or Firm* — Reising Ethington, P.C.

(57)    ABSTRACT

A sheathed wire harness includes connectors to be fitted to counterpart connectors, electric wires connected to the connectors, and a fibrous resin cloth that is connected to the electric wires and surrounds the electric wires. The resin cloth includes a cover portion that can be moved to a closed
(Continued)

position in which portions of the electric wires near the connectors are covered, and moved to an open position in which the portions of the electric wires near the connectors are exposed.

7 Claims, 27 Drawing Sheets

(51) Int. Cl.
*H01B 7/00* (2006.01)
*H01B 3/30* (2006.01)
*H01R 13/52* (2006.01)
*B60R 16/02* (2006.01)
*H01B 7/17* (2006.01)
*H01R 13/516* (2006.01)

(52) U.S. Cl.
CPC ........... *H01B 7/17* (2013.01); *H01R 13/5213* (2013.01); *H01R 13/516* (2013.01); *H01R 2201/26* (2013.01)

(56) References Cited

U.S. PATENT DOCUMENTS

| 6,918,785 B1 * | 7/2005 | Reilly ................ H01R 13/5804 439/464 |
| 2014/0190742 A1 | 7/2014 | Kajiwara |
| 2015/0068802 A1 | 3/2015 | Kajiwara |

FOREIGN PATENT DOCUMENTS

| JP | 2013020717 A | 1/2013 |
| JP | 2014161156 A | 9/2014 |
| WO | WO2013057972 A1 | 4/2013 |
| WO | WO2013161131 A1 | 10/2013 |
| WO | WO2014050221 A1 | 4/2014 |

OTHER PUBLICATIONS

International Preliminary Report on Patentability for Application No. PCT/JP2016/051796, 7 pages, dated Jul. 13.

* cited by examiner

SHEATHED WIRE HARNESS

CROSS REFERENCE TO RELATED APPLICATIONS

This application claims the priority of Japanese patent application JP2015-025414 filed on Feb. 12, 2015, and Japanese patent application JP2015-071163 filed on Mar. 31, 2015, the entire contents of both applications are incorporated herein.

TECHNICAL FIELD

The present specification discloses a sheathed wire harness.

BACKGROUND ART

Conventionally, a technique for connecting a connector to an end portion of an electric wire has been known. Patent Document 1 (JP2013-20717A) describes a wire harness in which a connector is attached to one end thereof. A corrugated tube sheaths this wire harness and protects portions of electric wires on the connector side.

SUMMARY

In general, corrugated tubes are made of a hard synthetic resin. Therefore, in a state in which the corrugated tubes sheath wire harnesses, it is not easy to freely move the wire harnesses. For this reason, a problem arises in that, in a state in which a connector is connected to an end portion of the wire harness, it is not easy to connect this connector to a counterpart connector.

The present design was accomplished based on the above-mentioned circumstances, and it is an object thereof to provide a sheathed wire harness with which a connector connecting operation can be facilitated while a portion of an electric wire on the connector side is protected.

A sheathed wire harness of the present design includes a connector to be fitted to a counterpart connector, an electric wire connected to the connector, and a fibrous resin cloth for surrounding the electric wire, wherein the resin cloth includes a cover portion that can be moved to a closed position in which a portion of the electric wire on the connector side is covered, and moved to an open position in which the portion of the electric wire on the connector side is exposed.

With this configuration, when the cover portion of the resin cloth is in the open position in which the portion of the electric wire on the connector side is exposed, the degree of freedom of connector movement increases, thus making it possible to facilitate a connector connecting operation. When the cover portion is moved from the open position to the closed position, the portion of the electric wire on the connector side can be covered and protected. Therefore, the connector connecting operation can be facilitated while the portion of the electric wire on the connector side is protected.

When the electric wire is arranged in a vibrating environment such as a vehicle, hitting sounds may be generated by the electric wire hitting against another member and the like due to vibrations. Since hitting sounds cause user discomfort, a sound-reducing material may be wound around the electric wire in order to take a measure against the hitting sounds. However, a wire harness around which a sound-reducing material has been wound becomes thick, and thus a problem arises in that it is difficult to arrange the wire harness in a narrow space. With the above configuration, the electric wire is protected by the resin cloth surrounding the electric wire, and therefore, hitting sounds generated by the vibration of the electric wire can be reduced due to the sound absorbing property of the resin cloth.

The following embodiments are preferred as embodiments of the present design.

The resin cloth includes a holding portion with which the cover portion can be held in the closed position and released therefrom.

With this configuration, the cover portion can be held in the closed position and released therefrom as needed.

The cover portion includes a held portion to be held by the holding portion, and the holding portion and the held portion both have flexibility.

With this configuration, the holding portion and the held portion bend easily in response to the deformation of the resin cloth, thus making it possible to improve the workability.

The resin cloth includes a tubular portion for surrounding the electric wire, and an extending portion that extends from the tubular portion toward the connector and is configured to cover a portion of the electric wire that is not covered with the cover portion, and the cover portion is continuous with a lateral side of the extending portion relative to a direction in which the extending portion extends.

The cover portion includes an overlap portion that overlaps the resin cloth when the cover portion is in the closed position.

With this configuration, the exposure of the portion of the electric wire on the connector side can be reduced, and thus the electric wire can be protected reliably.

The cover portion extends to a position at which the entirety of the connector is covered.

With this configuration, the cover portion can protect not only the electric wire but also the connector.

The resin cloth includes a tubular portion for surrounding the electric wire, and a soft portion and a hard portion that is harder than the soft portion are provided at different positions of the tubular portion in a direction in which the tubular portion extends.

With this configuration, the hard portion of the tubular portion protects the electric wire from the outside due to its hardness, and a channel in the tubular portion can be bent at the soft portion of the tubular portion.

With the present design, the connector connecting operation can be facilitated while the portion of the electric wire on the connector side is protected.

DESCRIPTION OF EMBODIMENTS

Embodiment 1

Embodiment 1 will be described with reference to FIGS. 1 to 6.

A sheathed wire harness 10 of this embodiment can be used as a conductive path that connects a battery pack (not shown) serving as a driving source for a vehicle such as an electric car or a hybrid car, and a device (not shown) such as an inverter or a motor, for example. The battery pack includes a battery module including a plurality of battery cells, and an ECU (electronic control unit) 40 that manages and controls the voltages and the like of the battery cells. In this embodiment, the sheathed wire harness 10 to be connected to the ECU 40 will be described. In the following description, the left side of FIG. 1 is referred to as "front side", and the right side thereof is referred to as "rear side".

Figure 1:
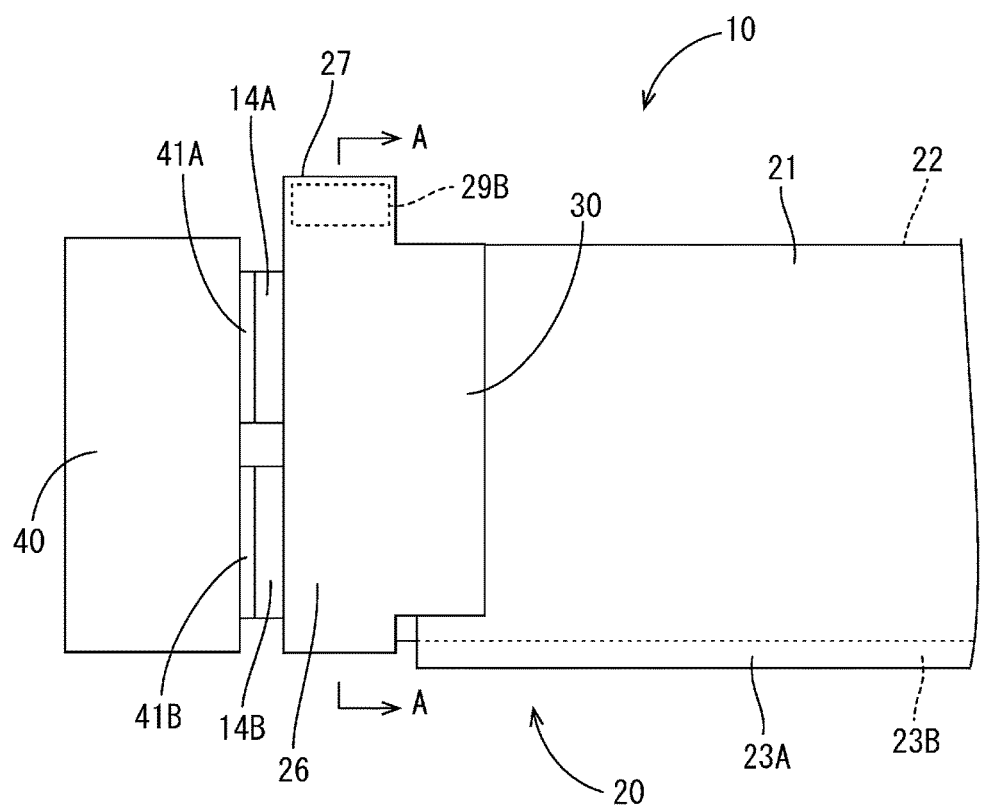
FIG. 1 is a plan view of a sheathed wire harness of Embodiment 1.
Figure 2:
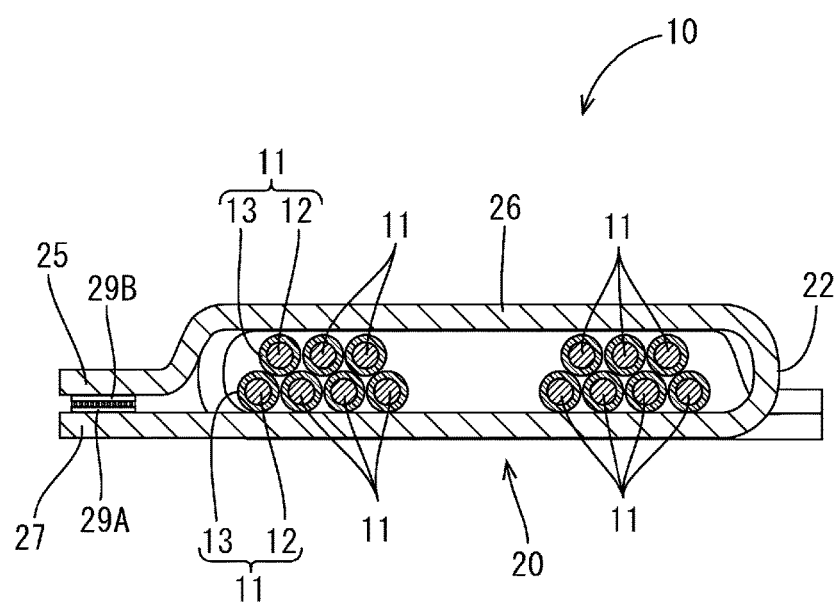
FIG. 2 is a cross-sectional view taken along line A-A in FIG. 1.

As shown in FIGS. 1 and 2, the sheathed wire harness 10 includes a plurality of (fourteen in this embodiment) electric wires 11, connectors 14A and 14B that are connected to the end portions of the plurality of electric wires 11, and a resin cloth 20 that surrounds the plurality of electric wires 11 all together. Each of the electric wires 11 is a coated electric wire that has a circular cross section and includes a core wire 12 and an insulating coating (insulating layer) 13 that covers the circumference of the core wire 12. The core wire 12 is made of copper, a copper alloy, or an aluminum alloy. A stranded wire obtained by twisting a plurality of metal strands, a single-core wire, or the like can be used as the core wire 12, for example.

Figure 6:
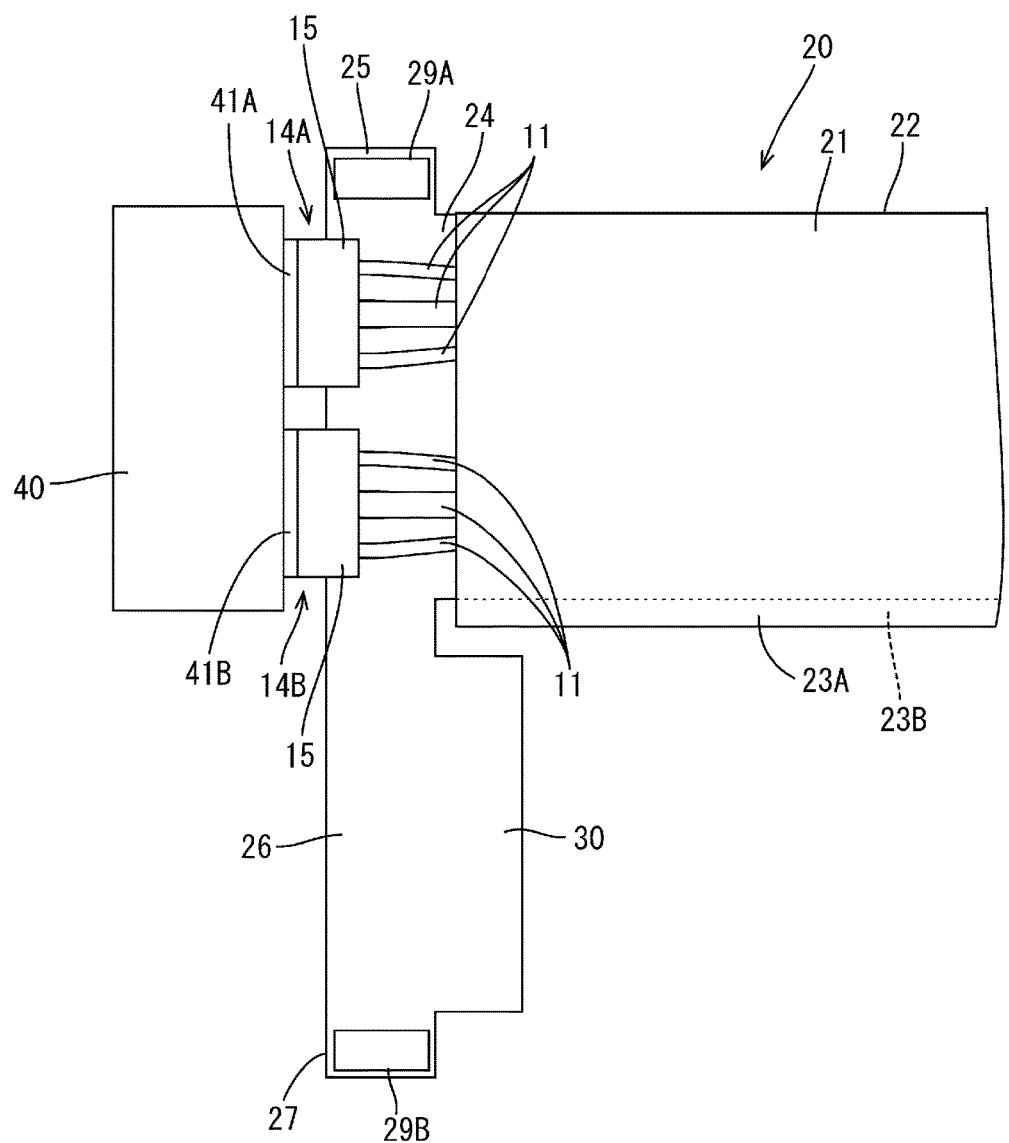
FIG. 6 is a plan view showing a state in which the connectors have been connected to device-connectors from the state shown in FIG. 5.

As shown in FIG. 6, the connectors 14A and 14B each include a housing 15 and a plurality of connector terminals (not shown) held by the housing 15. Each of the connector terminals is electrically connected to one of the core wires 12. The housing 15 has a rectangular parallelepiped shape and includes a plurality of accommodation chambers (not shown) that accommodate the connector terminals. The connectors 14A and 14B are fitted to device-connectors 41A and 41B of the ECU 40, respectively, and thus the electric wires 11 are electrically connected to a circuit of the ECU 40.

The resin cloth 20 includes a tubular portion 21 having a tubular shape for surrounding the electric wires 11, an extending portion 24 extending forward from the end portion on the front side of the tubular portion 21, and a cover portion 26 extending in a band shape from a lateral side of the extending portion 24. The tubular portion 21 is formed to extend over substantially the entire length (substantially the entire length excluding the lengths of the extending portion 24 and the cover portion 26 in the longitudinal direction) of the electric wires 11 in the longitudinal direction (the direction in which the electric wires 11 extend), and surrounds the plurality of electric wires 11. The tubular portion 21 has enough bendability that, when an external force is applied to it, the tubular portion 21 is easily deformed in a direction that depends on the external force.

In the tubular portion 21, fastening portions 23A and 23B of the resin cloth 20 are placed one on top of the other and fastened together. A portion of the tubular portion 21 on a side opposite to the fastening portions 23A and 23B forms a folded-back portion 22 having a shape that is folded back, sandwiching the plurality of electric wires 11. The extending portion 24 extends forward from a portion corresponding to about half of the front end of the tubular portion 21 in the circumferential direction. The cover portion 26 is formed on one lateral side, relative to the extension direction, of the extending portion 24, and a holding portion 25 that is locked to the cover portion 26 and holds the cover portion 26 in the closed position in which the electric wires 11 are covered is formed on the other lateral side, relative to the extension direction, of the extending portion 24.

The cover portion 26 has substantially the same width (dimension in the vertical direction in FIG. 6; half of the length of the tubular portion 21 in the circumferential direction) as the extending portion 24. The cover portion 26 can be moved to a closed position in which the portions of the electric wires 11 near the connectors 14A and 14B are covered, and moved to the open position (open state) in which the portions of the electric wires 11 near the connectors 14A and 14B are exposed, using the portion between the cover portion 26 and the extending portion 24 as a pivot. A held portion 27 to be held by the holding portion 25 is formed at an end portion of the cover portion 26 on a side opposite to the extending portion 24.

Rectangular hook-and-loop fasteners 29A and 29B that maintain a locking state through contact with each other are fixed to the holding portion 25 and the held portion 27, respectively, using an adhesive or the like. The hook-and-loop fasteners 29A and 29B are adhered to each other by pressing a hook side against a loop side, and can be freely fastened and separated. An overlap portion 30 that has a predetermined dimension and is configured to overlap the outer surface of the tubular portion 21 extends from the rear side of the cover portion 26. The overlap portion 30 overlaps about half of the circumference of the front end portion of the tubular portion 21.

A nonwoven fabric (sheet) made of a fibrous synthetic resin is used as the resin cloth 20. The nonwoven fabric has a large number of pores, and examples thereof include a fiber sheet, a web (film-like sheet), and a batt (blanket-like fiber) in which fibers are oriented in one direction or random directions. The nonwoven fabric can be formed by, for example, joining fibers using an electrical means, a mechanical means, a chemical means, or a solvent, or using these means in combination. The fibers of the resin cloth 20 can be connected through welding, bonding, or the like, for example.

The resin cloth 20 has a thickness with which a hitting sound, which is generated when the resin cloth 20 comes into contact with another member such as a case of a battery pack while a vehicle vibrates, can be reduced to an extent that no user discomfort occurs. This thickness is set as appropriate depending on the material. Examples of the material of the resin cloth 20 include an aramid fiber, a glass fiber, a cellulose fiber, a nylon fiber, a vinylon fiber, a polyester fiber, a polyolefin fiber, and a rayon fiber.

In the resin cloth 20, a plurality of welded portions (not shown) are formed through welding using ultrasonic waves, a heating plates, vibration, a laser, or the like. The welded portions are formed through ultrasonic welding with the fastening portions 23A and 23B being sandwiched between a pair of ultrasonic welding horns from the outside. At the portions of the fastening portions 23A and 23B that have undergone ultrasonic welding through contact with the ultrasonic welding horns, the resin cloth 20 is flattened and thus becomes hard.

The connectors 14A and 14B are connected to the end portions of the plurality of electric wires 11, and fitted and connected to the device-connectors 41A and 41B (examples of the "counterpart connectors"), in a state in which the portions on the rear side thereof are accommodated inside the opening at the front end of the resin cloth 20 in a state in which the cover portion 26 is in the closed position, and the portions on the front side thereof are exposed to the outside. The ECU 40 includes the plurality of device-connectors 41A and 41B. In the device-connectors 41A and 41B, a plurality of connector terminals (not shown) are held in a connector housings.

Next, a method for manufacturing the sheathed wire harness 10 will be described.

Figure 3:
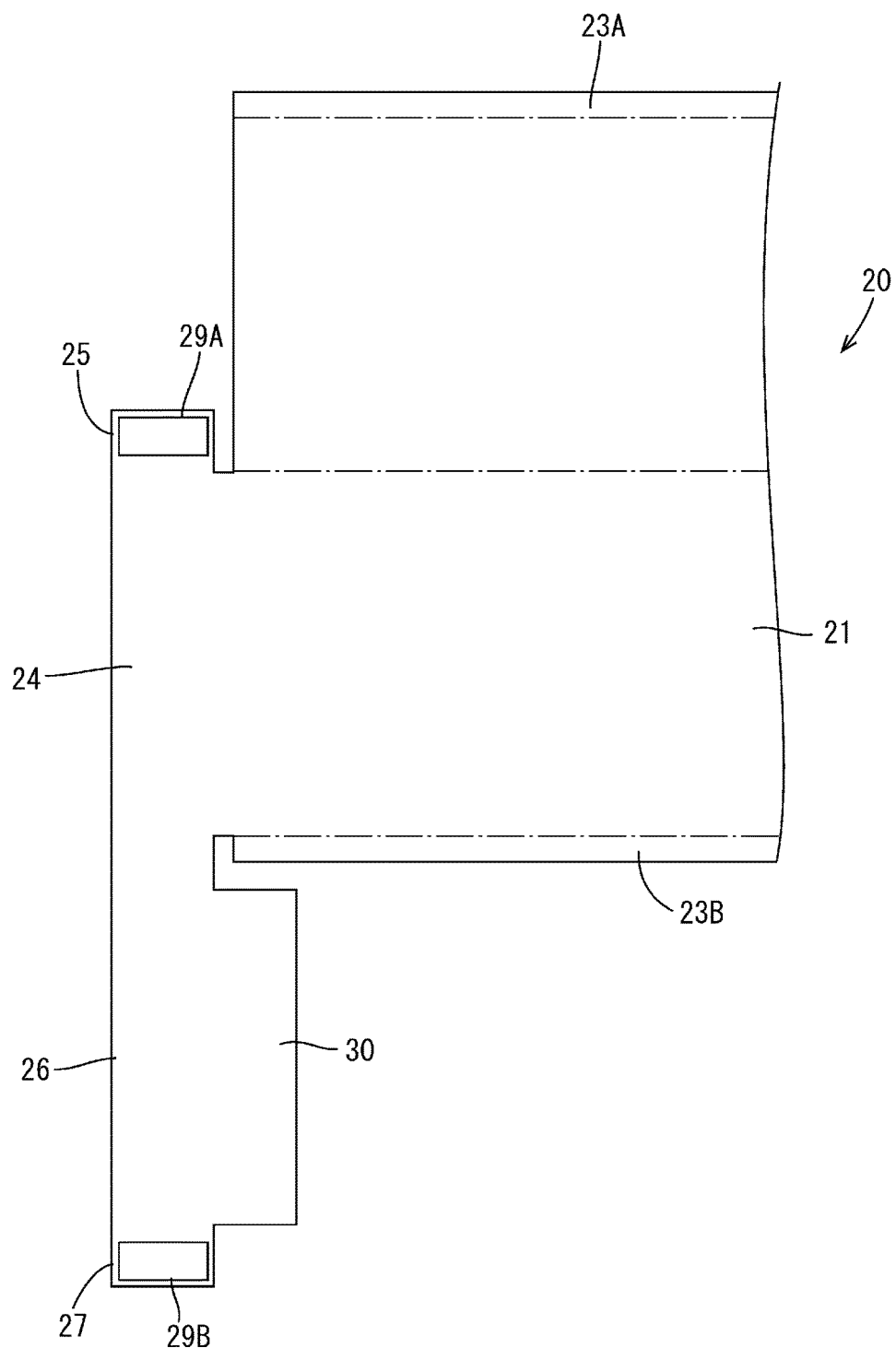
FIG. 3 is a plan view of a resin cloth in a spread state.
Figure 4:
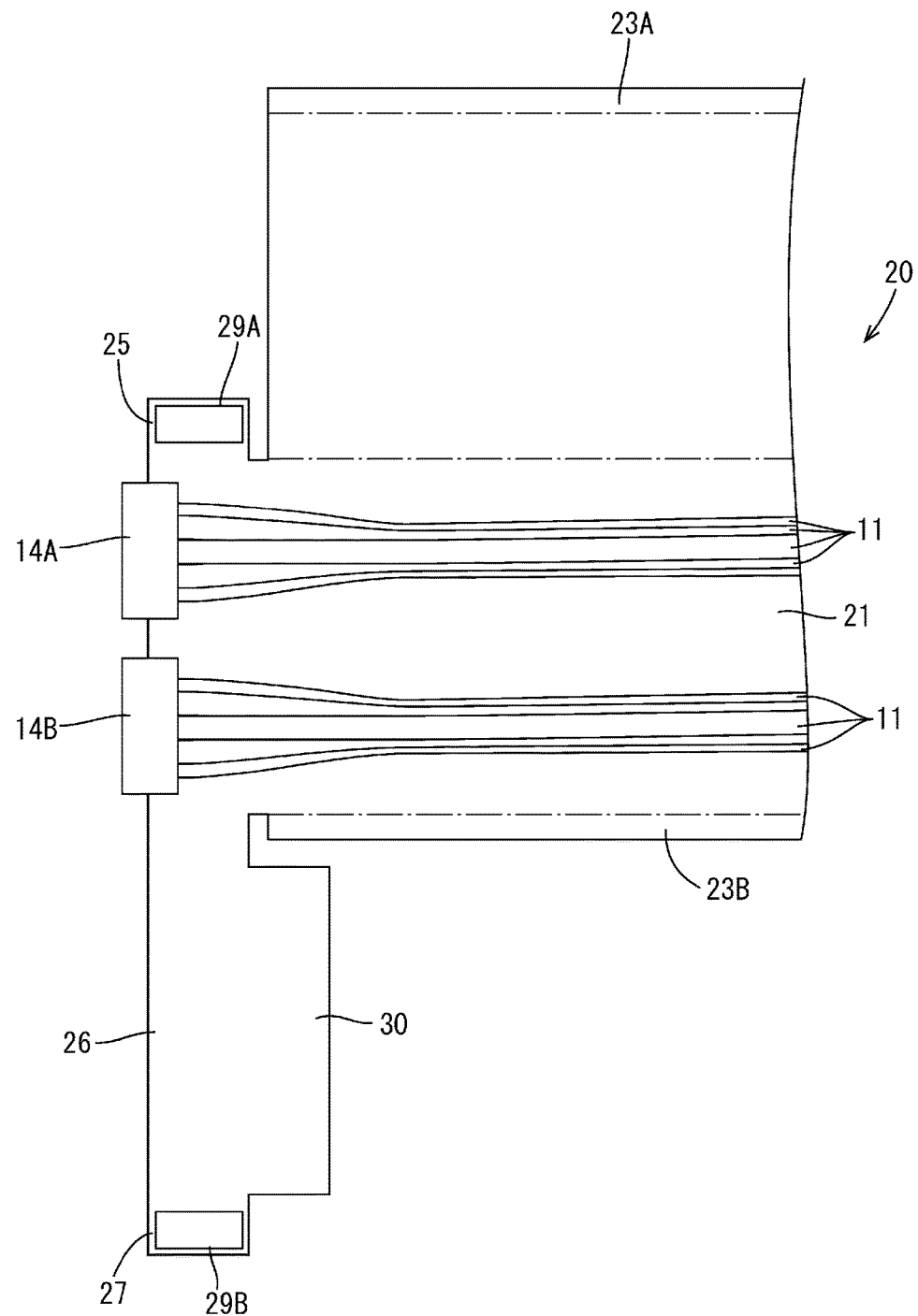
FIG. 4 is a plan view showing a state in which electric wires to which connectors have been connected are placed on the resin cloth in a spread state.
Figure 5:
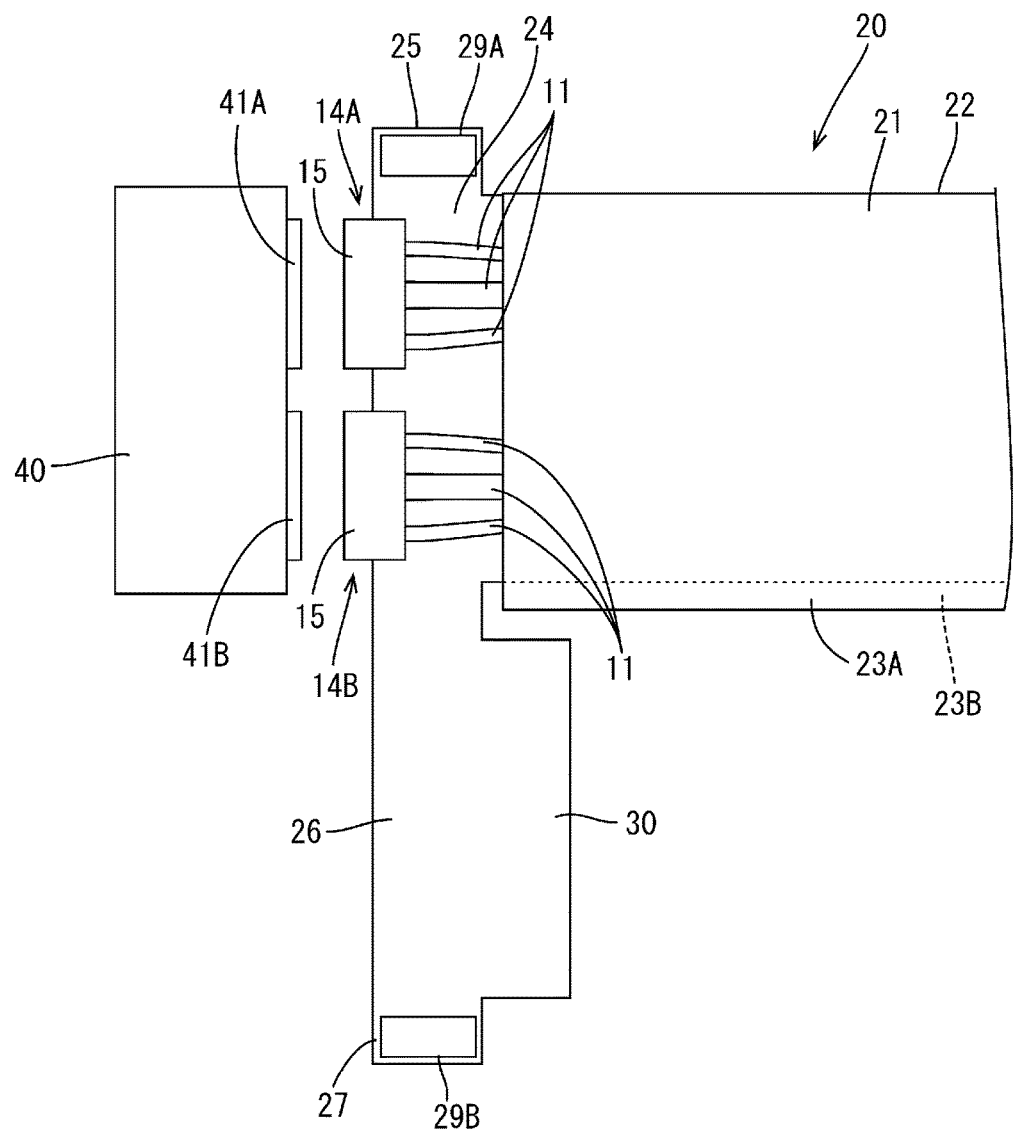
FIG. 5 is a plan view showing a state in which a tubular portion of the resin cloth is fastened and a cover portion thereof is in an open position.

The resin cloth 20 is formed in a spread state. As shown in FIG. 3, the hook-and-loop fasteners 29A and 29B are respectively sewn, stapled, or bonded to the holding portion 25 and the held portion 27 by sewing, a tacker (staple gun), or an adhesive, and thus fixed thereto. It should be noted that sewing and a tacker are preferable because they fasten the hook-and-loop fasteners 29A and 29B to the resin cloth 20 with strong force. Next, as shown in FIG. 4, the electric wires 11 in which the connectors 14A and 14B are connected to their end portions are placed on the resin cloth 20 in a spread state. Next, the fastening portions 23A and 23B are placed one on top of the other by holding a portion of the resin cloth 20 on the fastening portion 23A side (one end side) and folding back the resin cloth 20 so as to sandwich the electric wires 11 (FIG. 5). Then, the fastening portions 23A and 23B are fastened together through ultrasonic welding with the fastening portions 23A and 23B being sandwiched between the ultrasonic welding horns from the outside, and thus the tubular portion 21 is formed.

Next, as shown in FIG. 6, the connectors 14A and 14B are fitted to the device-connectors 41A and 41B. At this time, the electric wires 11 to which the connectors 14A and 14B have been connected have a sufficient length, the cover portion 26 is in the open position, and the connectors 14A and 14B are exposed. Therefore, the connectors 14A and 14B have a high degree of freedom of movement, thus making it easy to fit the connectors 14A and 14B to the device-connectors 41A and 41B. When the cover portion 26 is folded back and put in the closed position, the held portion 27 and the holding portion 25 overlap each other and are locked to each other using the hook-and-loop fasteners 29A and 29B, and thus the cover portion 26 is held in the closed position (FIG. 1).

With this embodiment, the following operational effects are exhibited.

With this embodiment, when the cover portion 26 of the resin cloth 20 is in the open position in which the portions of the electric wires 11 near the connectors 14A and 14B are exposed, the connectors 14A and 14B have an increased degree of freedom of movement, thus making it possible to facilitate the task of connecting the connectors 14A and 14B. When the cover portion 26 is moved from the open position to the closed position, the portions of the electric wires 11 near the connectors 14A and 14B can be covered and protected. Therefore, the task of connecting the connectors 14A and 14B can be facilitated while the portions of the electric wires 11 near the connectors 14A and 14B are protected.

When the electric wires 11 are arranged in a vibrating environment such as a vehicle, hitting sounds may be generated by the electric wires 11 hitting against another member and the like due to vibrations. Since hitting sounds cause user discomfort, a sound-reducing material may be wound around the electric wires 11 in order to take a measure against the hitting sounds. However, a wire harness around which a sound-reducing material has been wound becomes thick, and thus a problem arises in that it is difficult to arrange the wire harness in a narrow space. With this embodiment, the electric wires 11 are protected by the resin cloth 20 surrounding the electric wires 11, and therefore, hitting sounds generated by the vibration of the electric wires 11 can be reduced due to the sound absorbing property of the resin cloth 20.

The resin cloth 20 includes the holding portion 25 with which the cover portion 26 can be held in the closed position and released therefrom.

With this configuration, the cover portion 26 can be held in the closed position and released therefrom as needed.

The cover portion 26 includes the held portion 27 to be held by the holding portion 25, and the holding portion 25 and the held portion 27 both have flexibility or bendability.

With this configuration, the holding portion 25 and the held portion 27 bend easily in response to the deformation of the resin cloth 20, thus making it possible to improve the workability.

The resin cloth 20 includes the tubular portion 21 for surrounding the electric wires 11, and the extending portion 24 that extends from the tubular portion 21 toward the connectors 14A and 14B and is configured to cover portions of the electric wires 11 that are not covered with the cover portion 26. The cover portion 26 is continuous with the lateral side, relative to the extension direction, of the extending portion 24.

With this configuration, the configuration for covering the electric wires 11 with the cover portion 26 can be simplified.

The cover portion 26 includes the overlap portion 30 that overlaps the resin cloth 20 when the cover portion 26 is in the closed position.

With this configuration, the exposure of the portion of the electric wires 11 near the connectors 14A and 14B can be reduced, and thus the electric wires 11 can be protected reliably.

Embodiment 2

Figure 7:
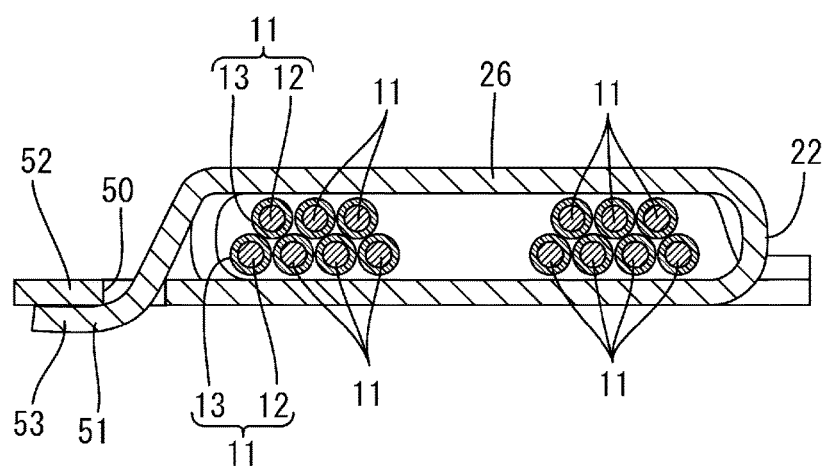
FIG. 7 is a cross-sectional view of a sheathed wire harness of Embodiment 2.

Embodiment 2 will be described with reference to FIG. 7. In the following description, the same constituent elements as those of Embodiment 1 are denoted by the same reference numerals.

In Embodiment 2, in order to locate the cover portion 26 in the closed position, the hook-and-loop fasteners 29A and 29B are not used, but a locking hole 50 is formed through a holding portion 52, and a locking piece 51 is provided on a held portion 53 of the cover portion 26. The locking piece 51 can be inserted through the locking hole 50, and is configured to pass through the locking hole 50 and be locked to the hole edge portion on a bottom surface side of the locking hole 50 when the cover portion 26 is in the closed position. Locking the locking piece 51 to the hole edge portion of the locking hole 50 in this manner restricts the movement of the cover portion 26 from the closed position to the open position. In order to release the cover portion 26, the lock of the locking piece 51 is released by removing the locking piece 51 from the locking hole 50, and thus the cover portion 26 can be moved to the open position.

Embodiment 3

Embodiment 3 will be described with reference to FIGS. 8 to 16. A cover portion 64 of Embodiment 3 extends forward from a tubular portion 62 and covers the entireties of the connectors 14A and 14B. In the following description, the same constituent elements as those of the above embodiments are denoted by the same reference numerals, and their further description is omitted.

Figure 8:
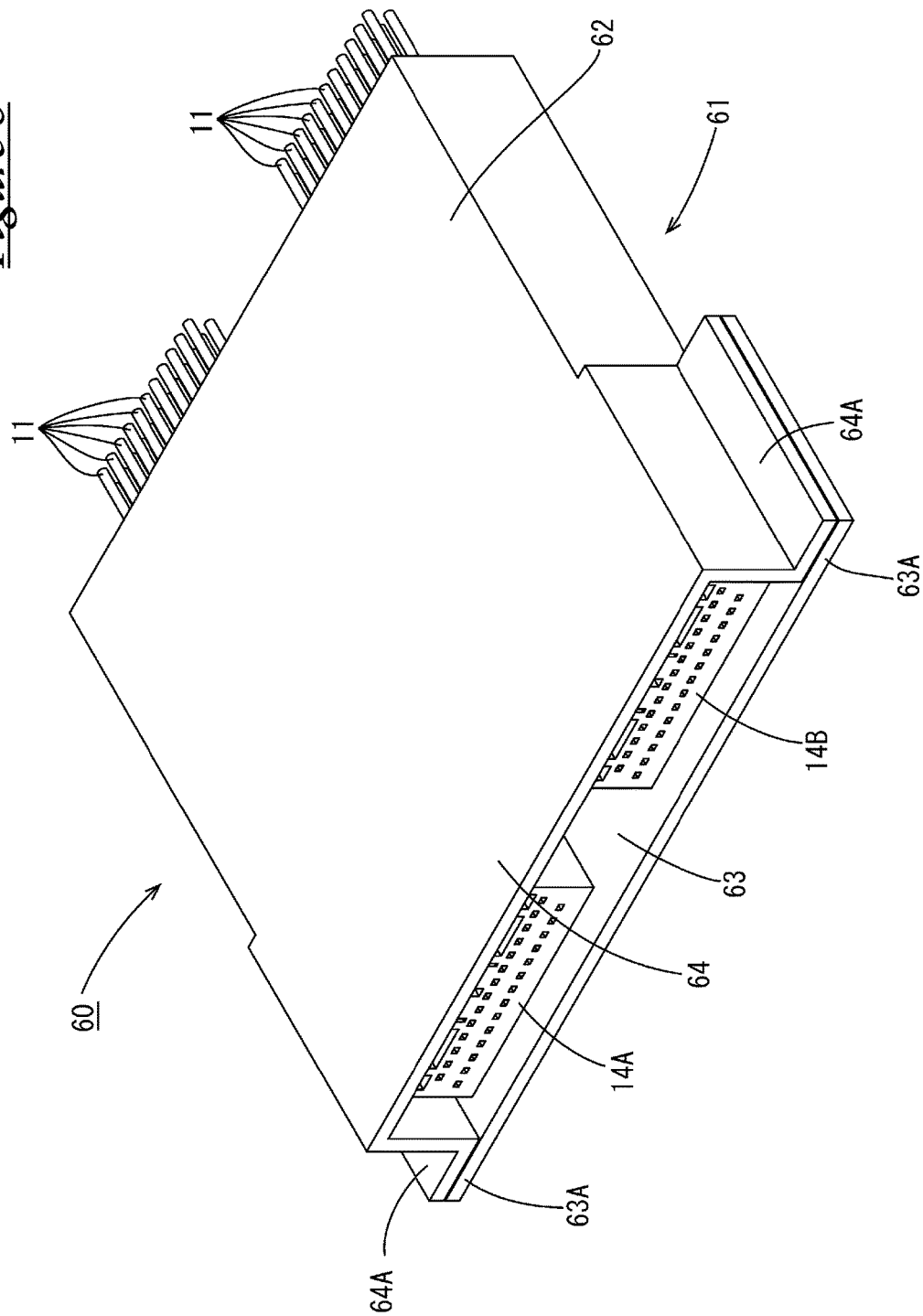
FIG. 8 is a perspective view of a sheathed wire harness of Embodiment 3.
Figure 9:
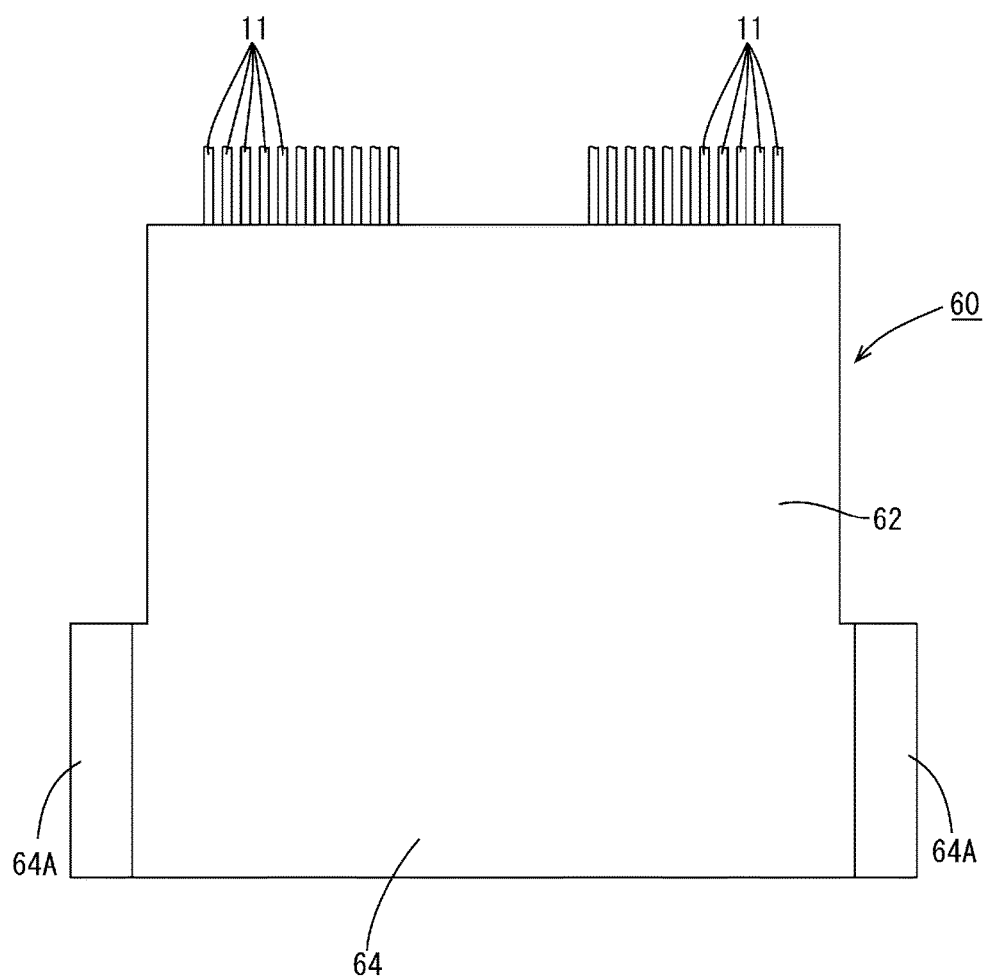
FIG. 9 is a plan view of the sheathed wire harness.
Figure 10:
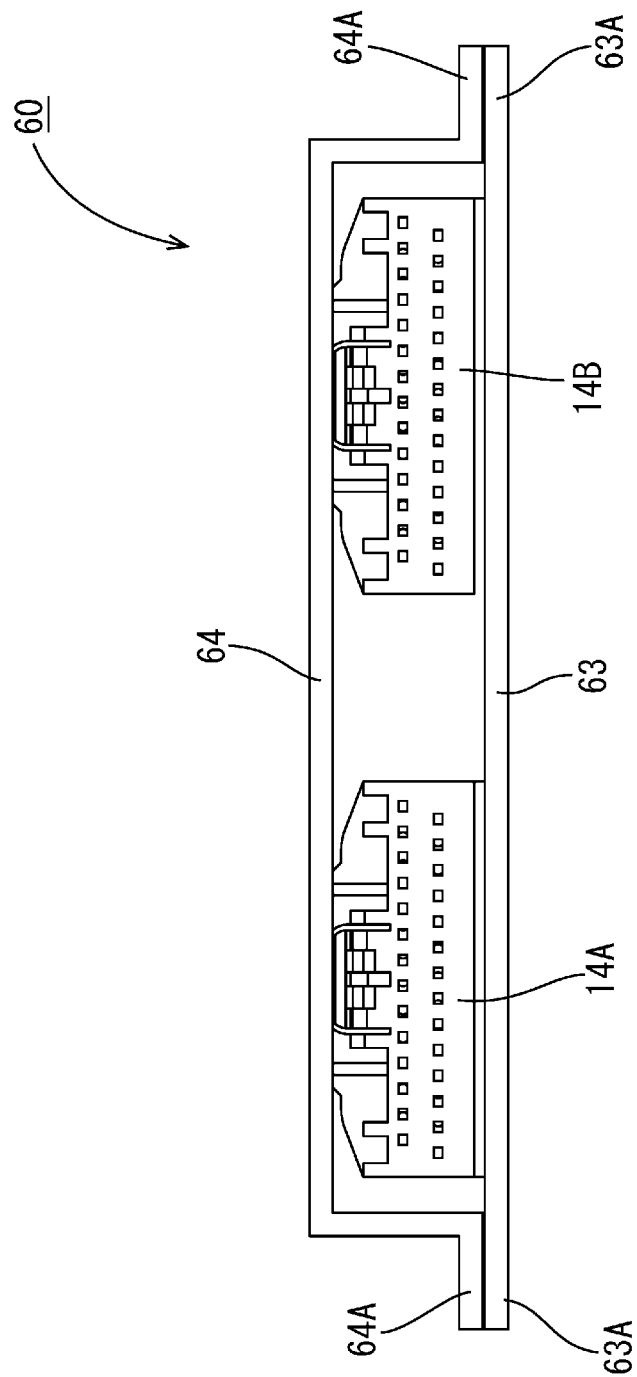
FIG. 10 is a front view of the sheathed wire harness.
Figure 11:
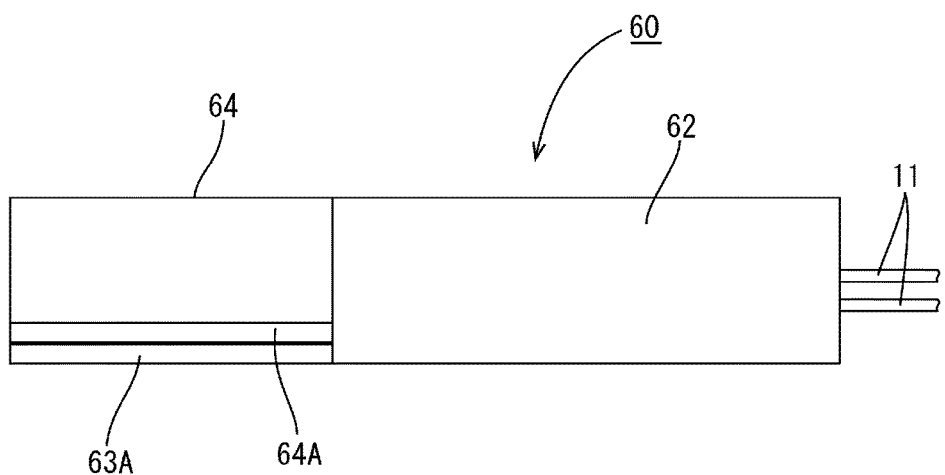
FIG. 11 is a side view of the sheathed wire harness.
Figure 12:
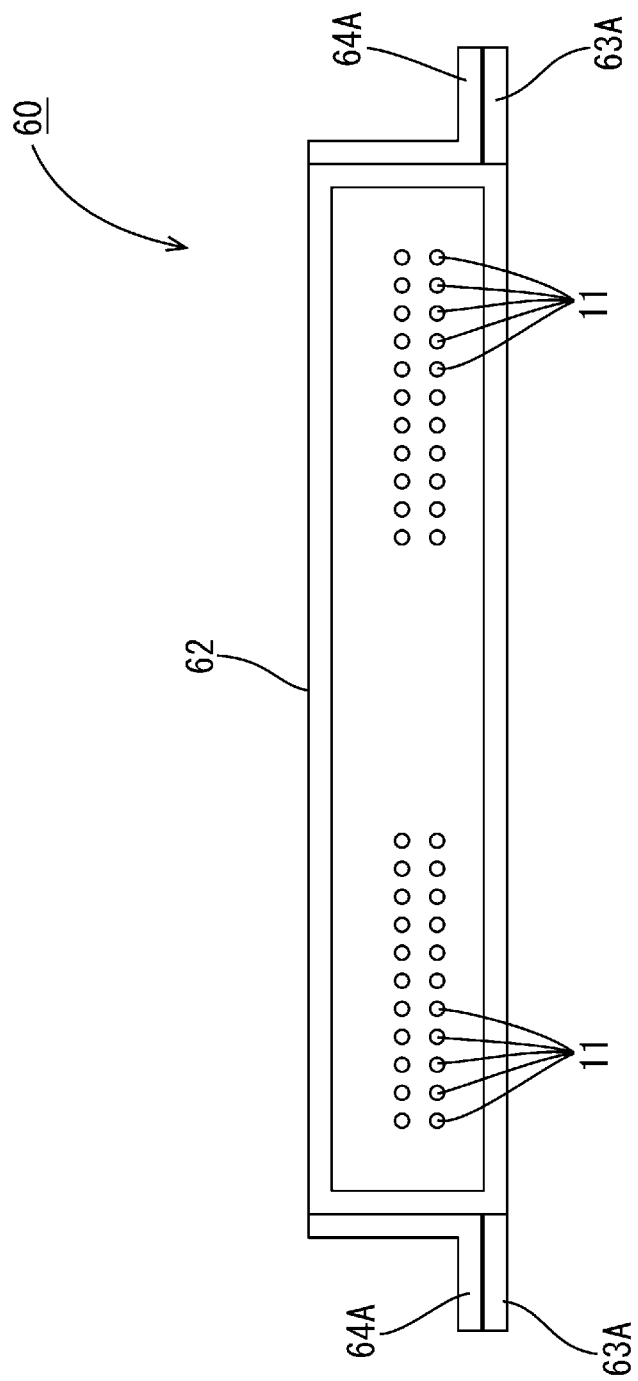
FIG. 12 is a back view of the sheathed wire harness.
Figure 13:
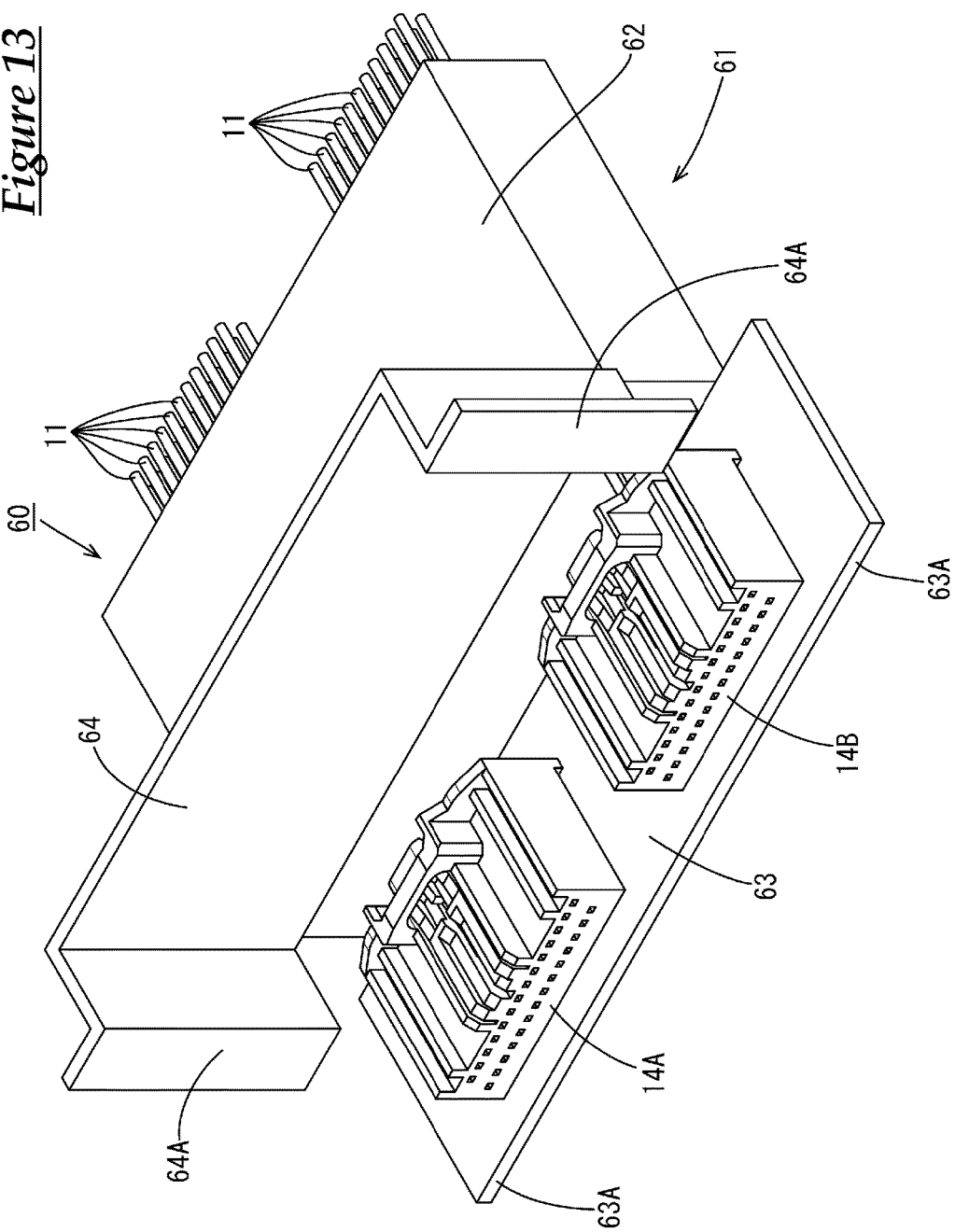
FIG. 13 is a perspective view of the sheathed wire harness in which a cover portion is in an open position.
Figure 14:
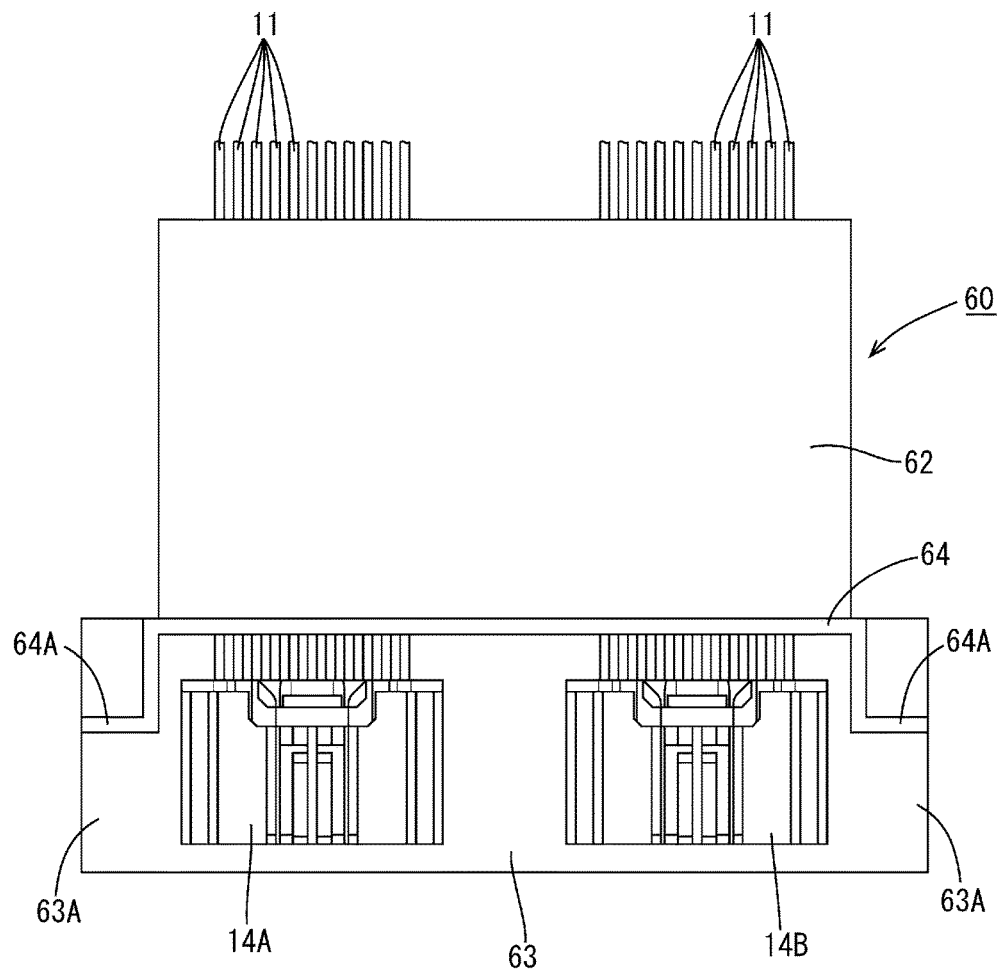
FIG. 14 is a plan view of the sheathed wire harness in which the cover portion is in an open position.
Figure 15:
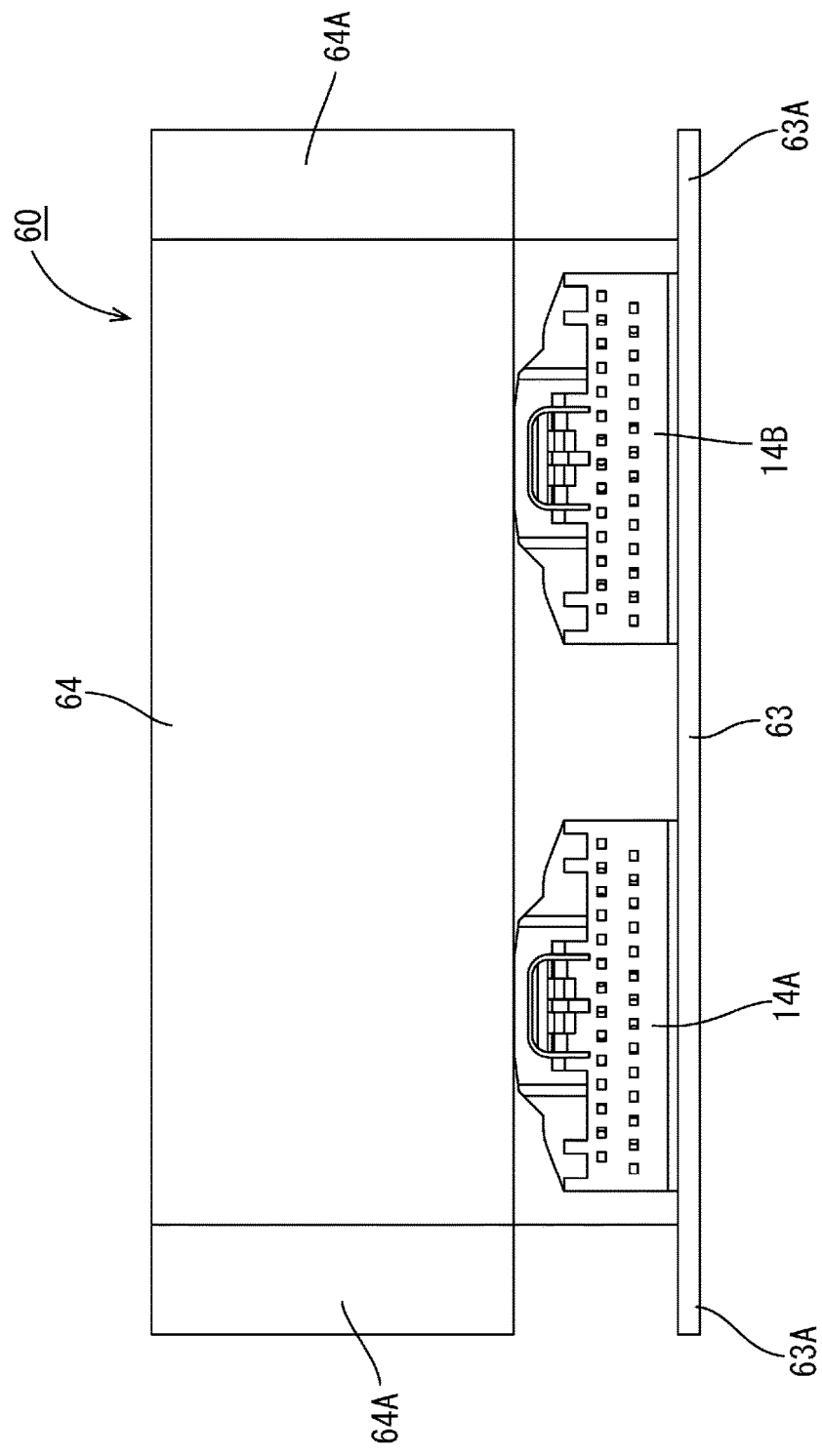
FIG. 15 is a front view of the sheathed wire harness in which the cover portion is in an open position.
Figure 16:
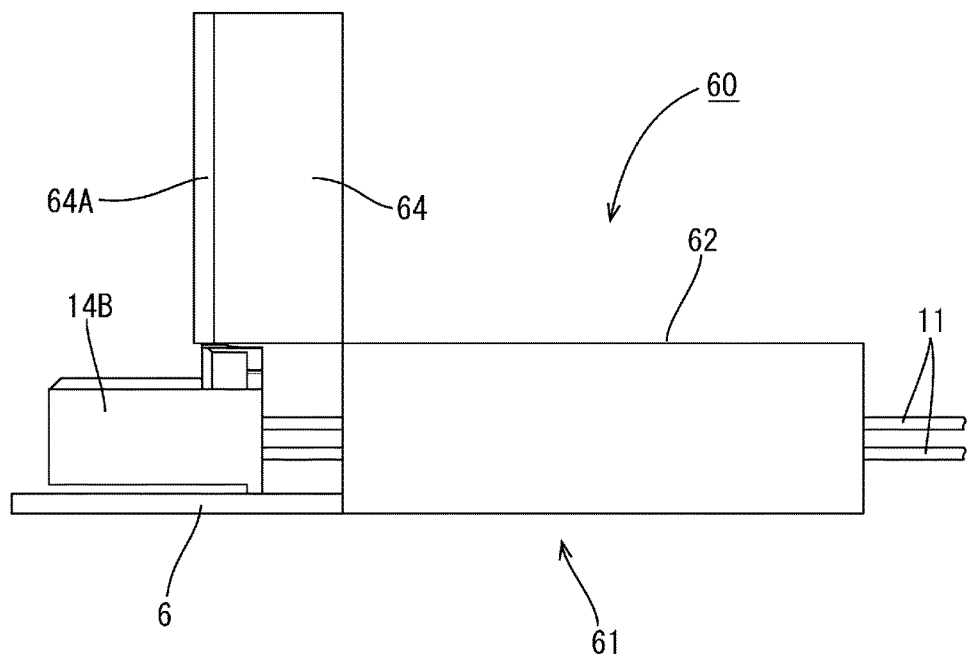
FIG. 16 is a side view of the sheathed wire harness in which the cover portion is in an open position.

As shown in FIG. 8, a sheathed wire harness 60 includes a plurality of electric wires 11, connectors 14A and 14B, and a resin cloth 61 that surrounds the plurality of electric wires 11 all together. The resin cloth 61 includes a tubular portion 62 having a polygonal tube shape for surrounding the electric wires 11, an extending portion 63 extending forward from the lower portion of the front end of the tubular portion 62, and a cover portion 64 extending forward from the upper portion of the front end of the tubular portion 62.

The material of the resin cloth 61 is the same as that of the resin cloth 20 of the above embodiments, but the resin cloth 61 has a reduced thickness through compression and is hardened (its bendability is reduced). Although the resin cloth 61 is harder than an uncompressed resin cloth, which is thick and soft, the resin cloth 61 has bendability (flexibility) to an extent that the cover portion 64 can be moved to the open position (FIG. 13) using its base end as a pivot. It should be noted that, although a hard resin cloth is used, there is no limitation thereto, and a soft resin cloth may be used in the same manner as the resin cloth 20.

The tubular portion 62 has an opening with a flat rectangular shape, and is formed in a tubular shape by placing fastening portions (not shown) of the resin cloth 61 on top of each other and fastening them together through ultrasonic welding, for example. It should be noted that the resin cloth 61 may also be formed in a tubular shape during molding without providing the fastening portions in the tubular portion 62. The extending portion 63 extends forward from a portion corresponding to about half of the front end of the tubular portion 62 in the circumferential direction. The extending portion 63 includes a projecting portion 63A that projects toward the lateral sides with respect to both lateral ends of the tubular portion 62.

The cover portion 64 has substantially the same width (dimension in the left-right direction in FIG. 10) as the extending portion 63. The cover portion 64 can be moved to the closed position (FIG. 8) in which the connectors 14A and 14B and the end portions of the electric wires 11 are covered, and moved to the open position (FIG. 13) in which the connectors 14A and 14B and the end portions of the electric wires 11 are exposed, using the base end side of the cover portion 64 (front end side of the tubular portion 62) as a pivot.

End portions 64A of the cover portion 64 are formed on separate planes by bending the left and right portions of the cover portion 64 in a crank shape, and come in surface contact with projecting portions 63A of the extending portion 63 (the end portions of the extending portion) when the cover portion 64 is in the closed position. Although the cover portion 64 in the open position can move to the closed position due to restoring force (elastic force) at a boundary portion between the cover portion 64 and the front end of the tubular portion 62, the cover portion 64 may also be moved to the closed position and the open position by an operator. The cover portion 64 may also be held in the closed position by providing the hook-and-loop fasteners 29A and 29B of Embodiment 1 between the cover portion 64 and the extending portion 63.

With Embodiment 3, the cover portion 64 extends to the position at which the entireties of the connectors 14A and 14B are covered, and therefore, the cover portion 64 can protect not only the electric wires 11 but also the entireties of the connectors 14A and 14B.

Embodiment 4

Embodiment 4 will be described with reference to FIGS. 17 to 25. A tubular portion 72 of a resin cloth 71 includes a soft portion 75 having bendability and hard portions 73 that are harder than the soft portion 75. In the following description, the same constituent elements as those of the above embodiments are denoted by the same reference numerals, and their further description is omitted.

Figure 17:
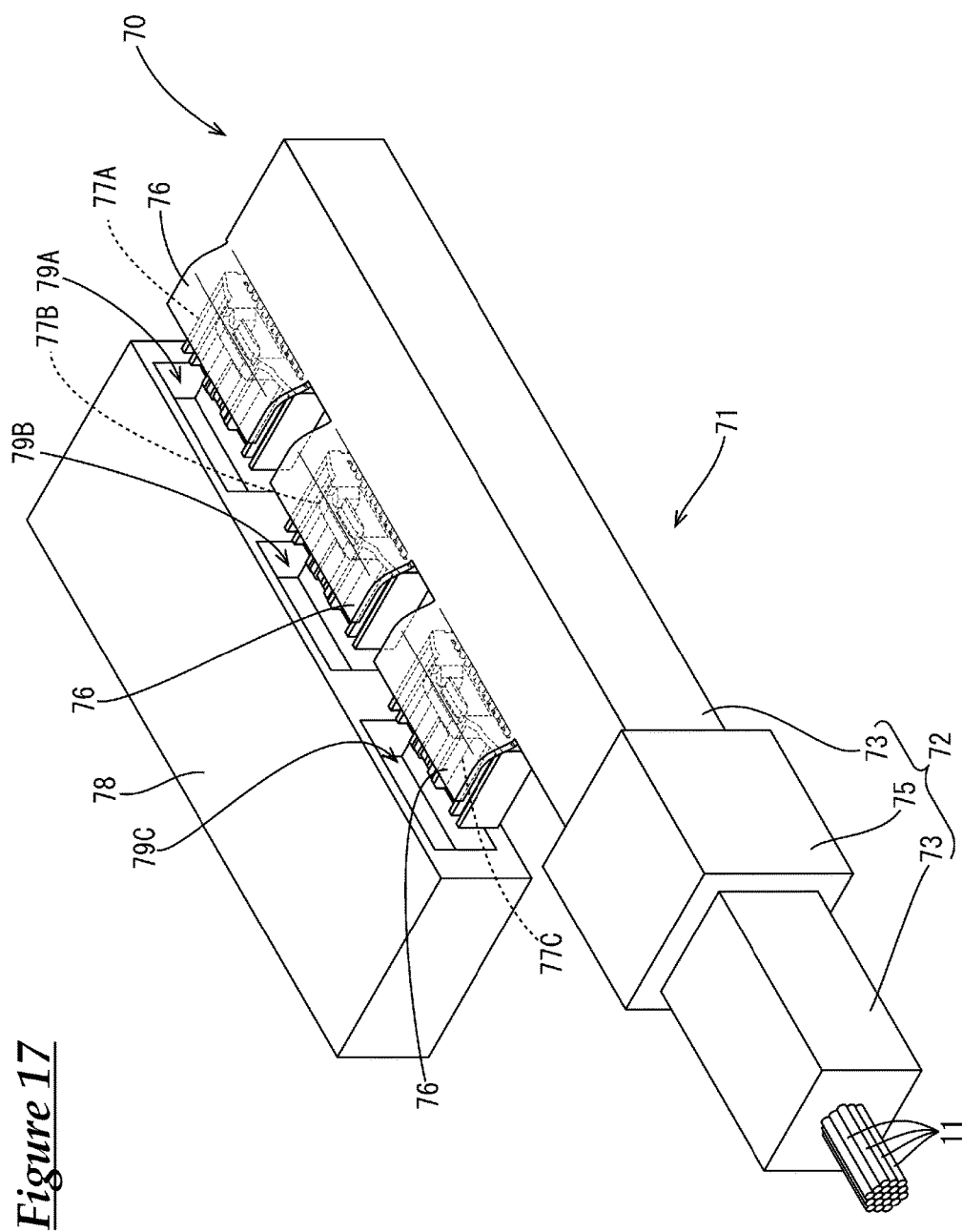
FIG. 17 is a perspective view showing a state in which a sheathed wire harness of Embodiment 4 is being attached to a device.
Figure 18:
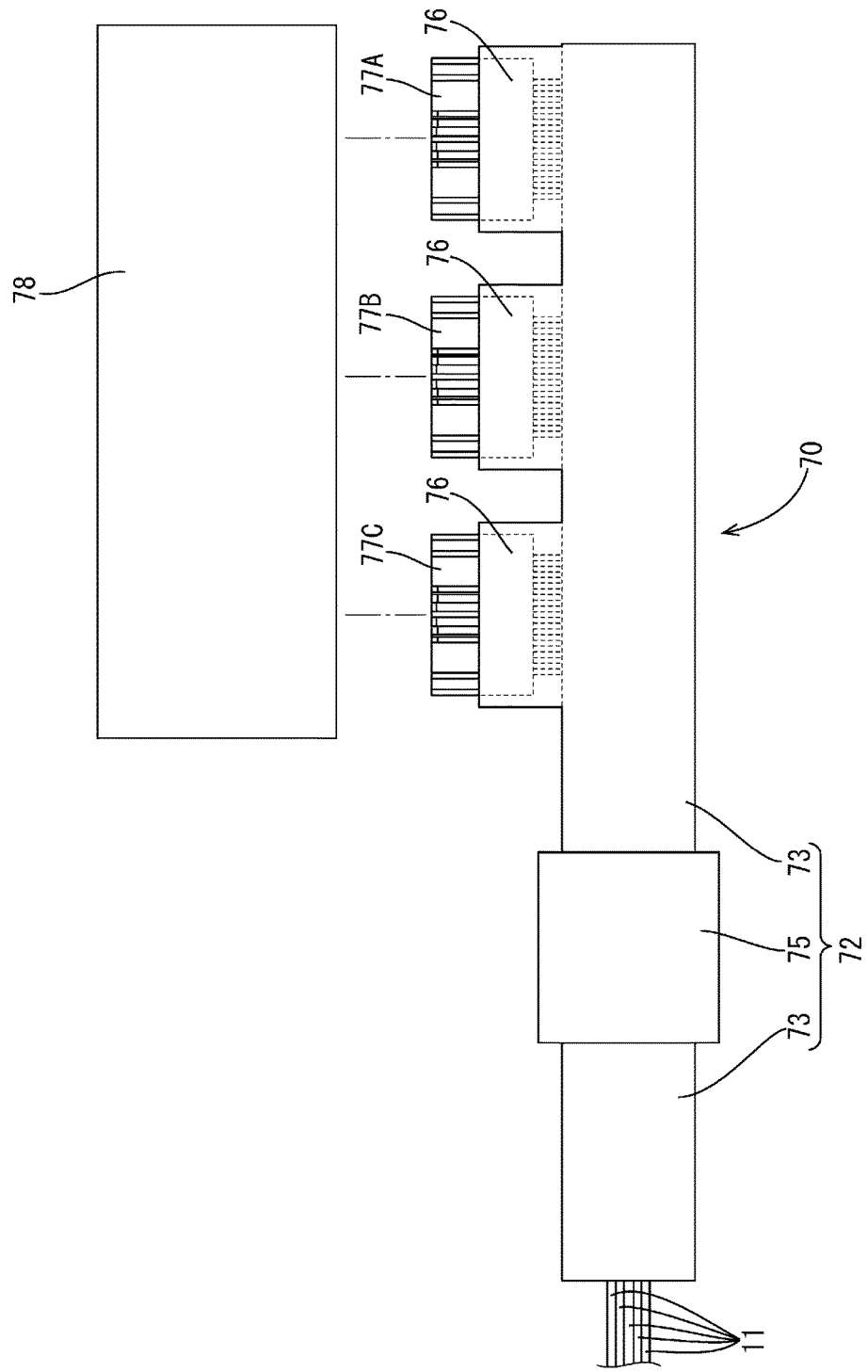
FIG. 18 is a plan view showing a state in which the sheathed wire harness is being attached to the device.
Figure 19:
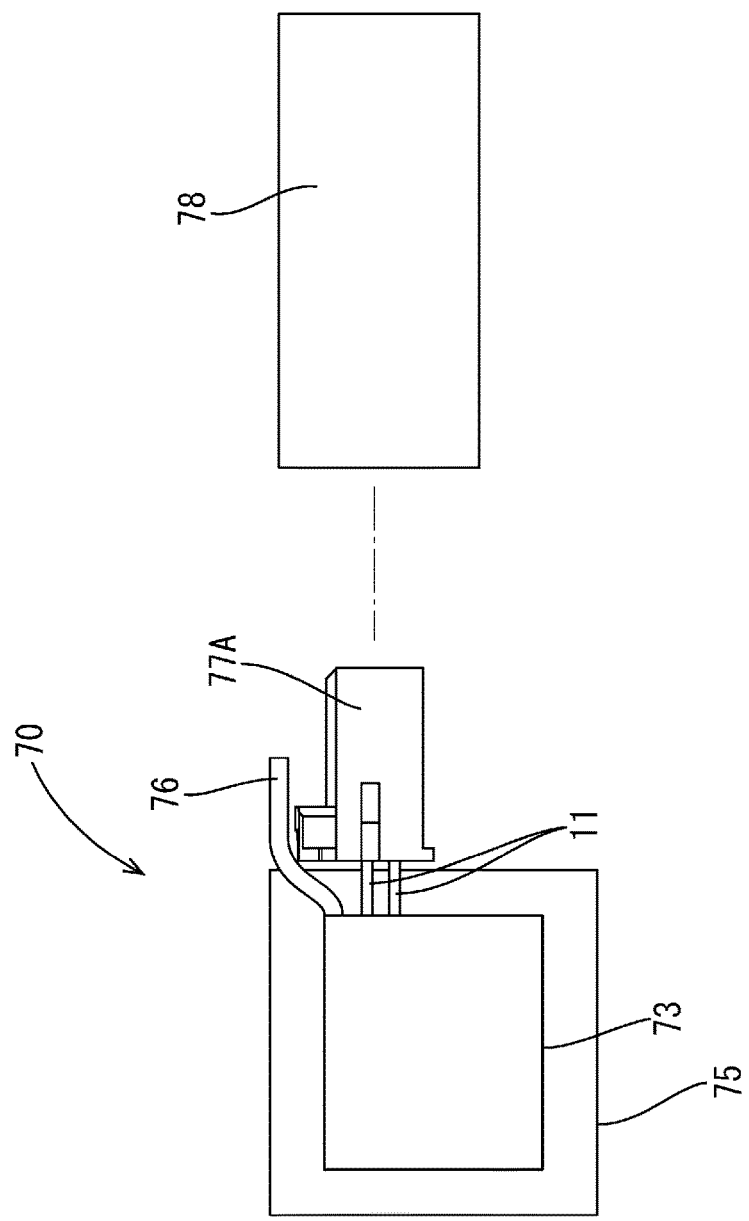
FIG. 19 is a side view showing a state in which the sheathed wire harness is being attached to the device.
Figure 20:
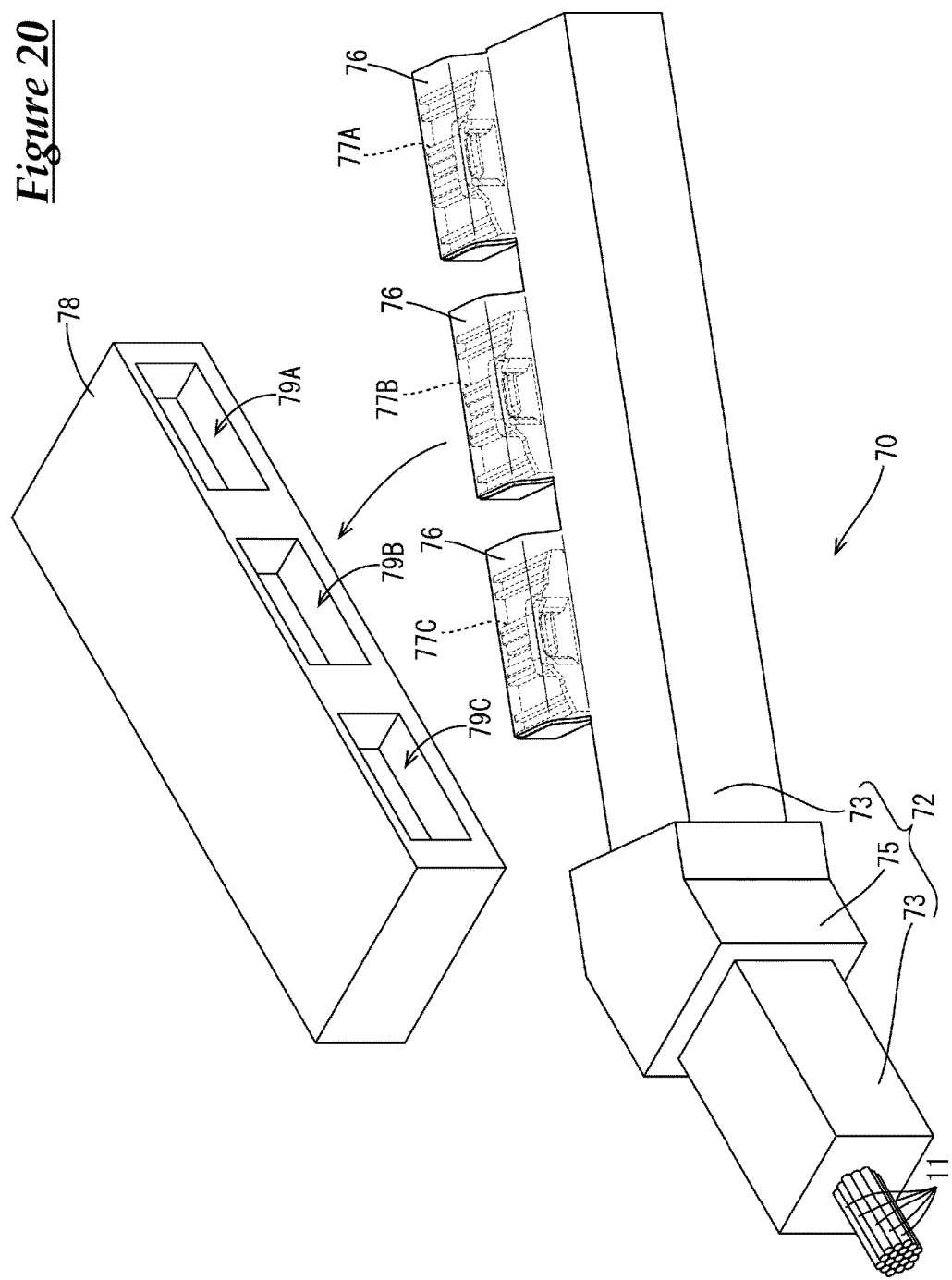
FIG. 20 is a perspective view showing a state in which a soft portion is bent while the sheathed wire harness is being attached to the device.
Figure 21:
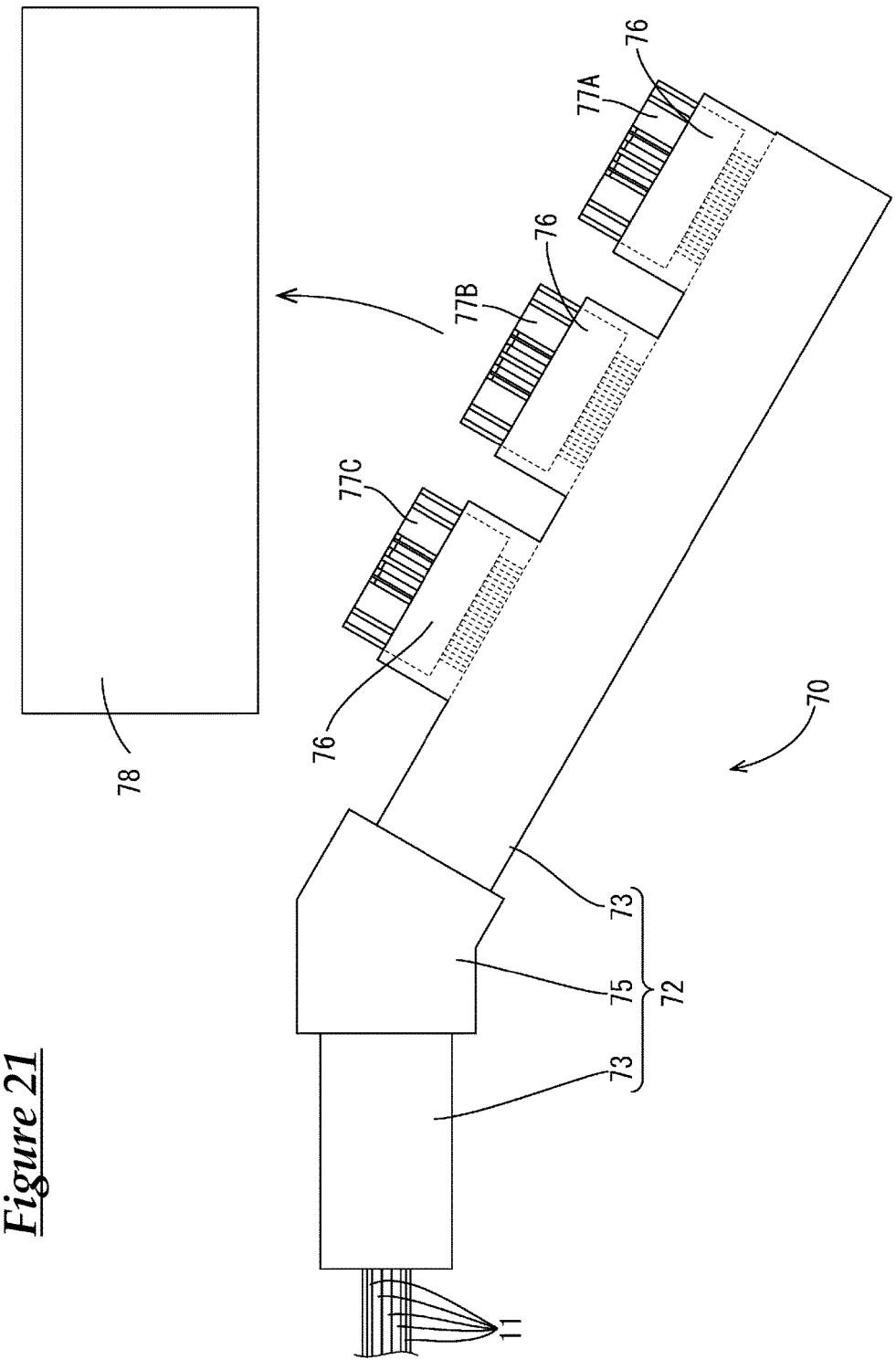
FIG. 21 is a plan view showing a state in which the soft portion is bent while the sheathed wire harness is being attached to the device.

As shown in FIG. 17, a sheathed wire harness 70 includes a plurality of electric wires 11, a plurality of connectors 77A, 77B, and 77C, and a resin cloth 71. The resin cloth 71 includes a tubular portion 72 having a polygonal tube shape for surrounding the plurality of electric wires 11 all together, and a cover portion 76 extending toward the lateral side, relative to the extension direction, of the tubular portion 72.

The tubular portion 72 extends in the direction in which the plurality of electric wires 11 extend, and is formed in a tubular shape by placing fastening portions (not shown) of the resin cloth 71 on top of each other and fastening them together through ultrasonic welding, for example. It should be noted that there is no limitation thereto, and the resin cloth 71 may be formed in a tubular shape in advance during molding of the resin cloth. The cover portion 76 can be moved to the closed position (FIG. 19) in which the connectors 77A, 77B, and 77C and the end portions of the electric wires 11 are covered, and moved to the open position (not shown) in which the connectors 77A, 77B, and 77C and the end portions of the electric wires 11 are exposed.

The cover portion 76 in the open position moves to the closed position due to elastic restoring force at a boundary portion between the cover portion 76 and the front end of the tubular portion 72 even if no external force is applied. The tubular portion 72 includes the hard portions 73 that are hardened and are provided with a reduced bendability (flexibility) through compression of the resin cloth 71, and the soft portion 75 that has not been compressed during and after molding and has bendability (flexibility) with which the soft portion 75 is easily deformed in a direction that depends on the external force. The soft portion 75 projects outward in a step-like manner with respect to the hard portions 73. The position of the hard portion 73 can be changed by rotating the hard portion 73 using the soft portion 75 as a pivot.

Figure 22:
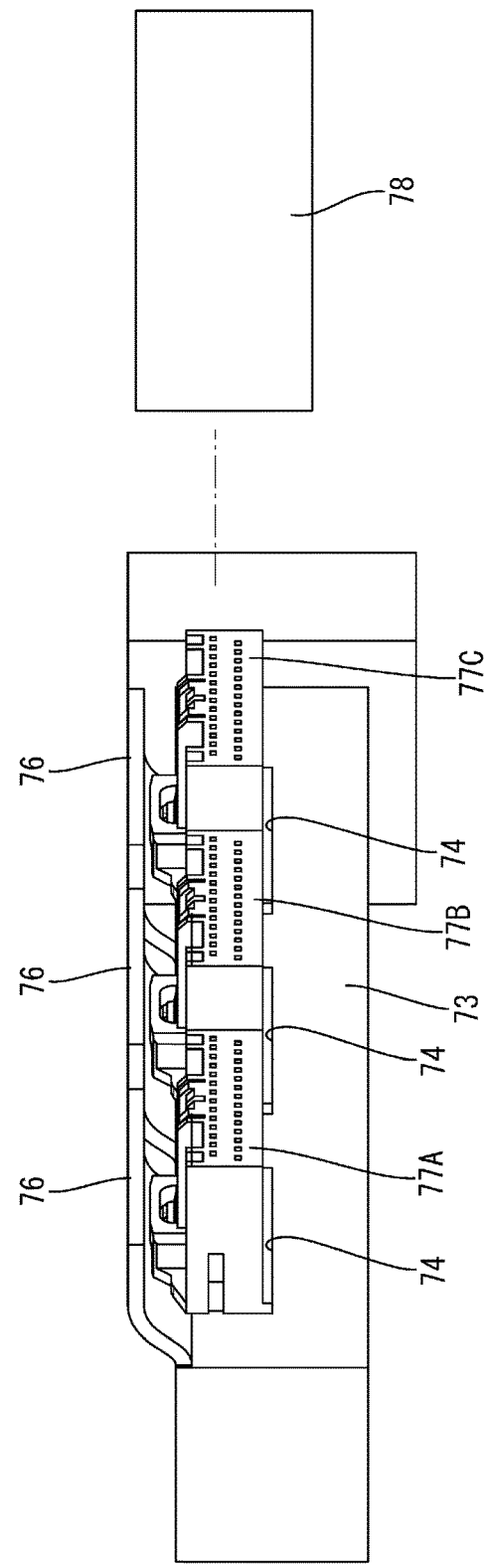
FIG. 22 is a side view showing a state in which the soft portion is bent while the sheathed wire harness is being attached to the device.
Figure 23:
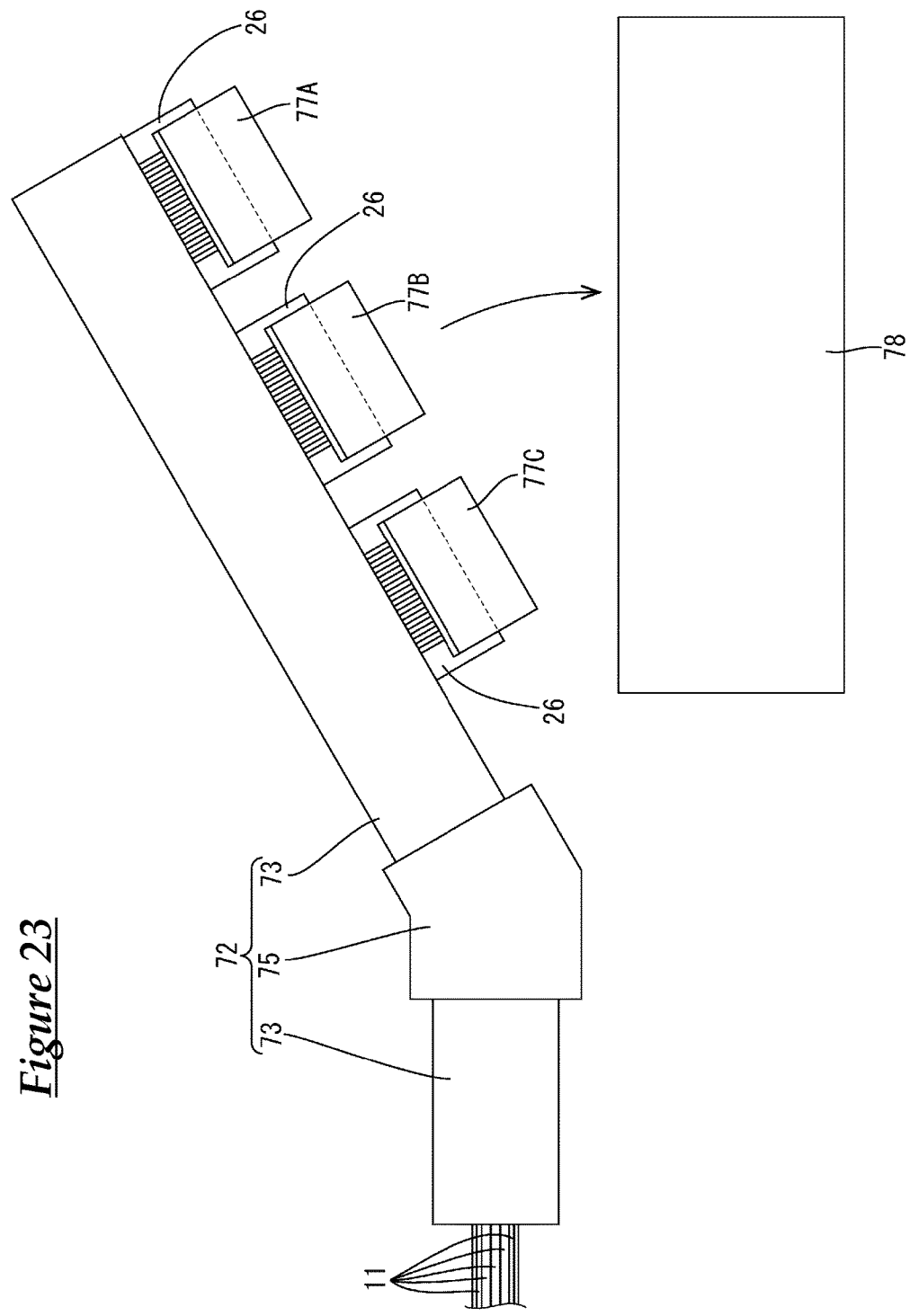
FIG. 23 is a bottom view showing a state in which the soft portion is bent while the sheathed wire harness is being attached to the device.

As shown in FIG. 22, a plurality of (three in this embodiment) opening portions 74 through which the connectors 77A, 77B, and 77C are to be led out are lined up in the hard portion 73 in the direction in which the tubular portion 72 extends (axis direction).

The cover portions 76 extend from the upper edges of the opening portions 74 toward the lateral side. The cover portions 76 each have a size with which the top portions of the connector 77A, 77B, or 77C and the end portions of the electric wires 11 can be covered in a state in which the connectors 77A, 77B, and 77C are respectively fitted to device-connectors 79A, 79B, and 79C of a device such as an ECU (Electronic Control Unit) 78. It should be noted that the cover portions 76 may be constituted by the soft portion 75 or the hard portion 73.

Figure 24:
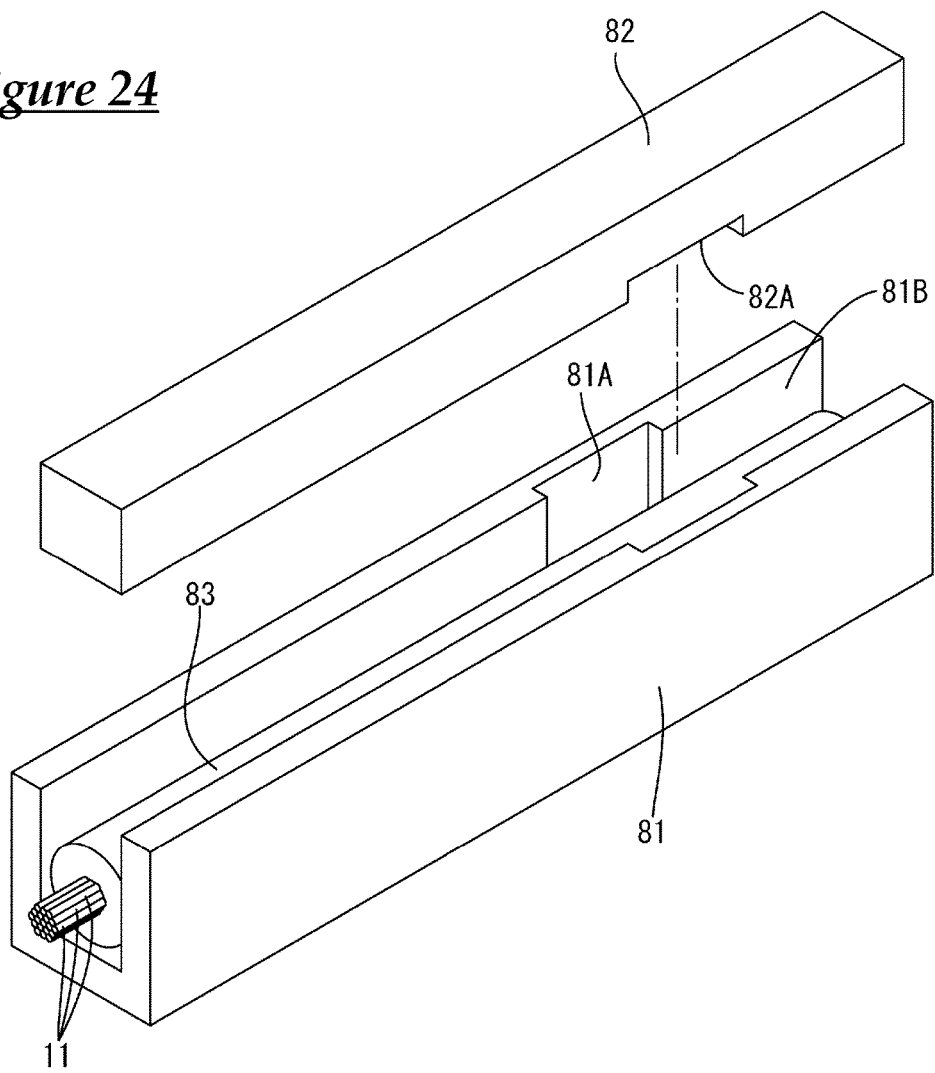
FIG. 24 is a perspective view showing a state before electric wires to which a resin cloth has been attached are accommodated in a lower mold and the resin cloth is flattened by an upper mold.
Figure 25:
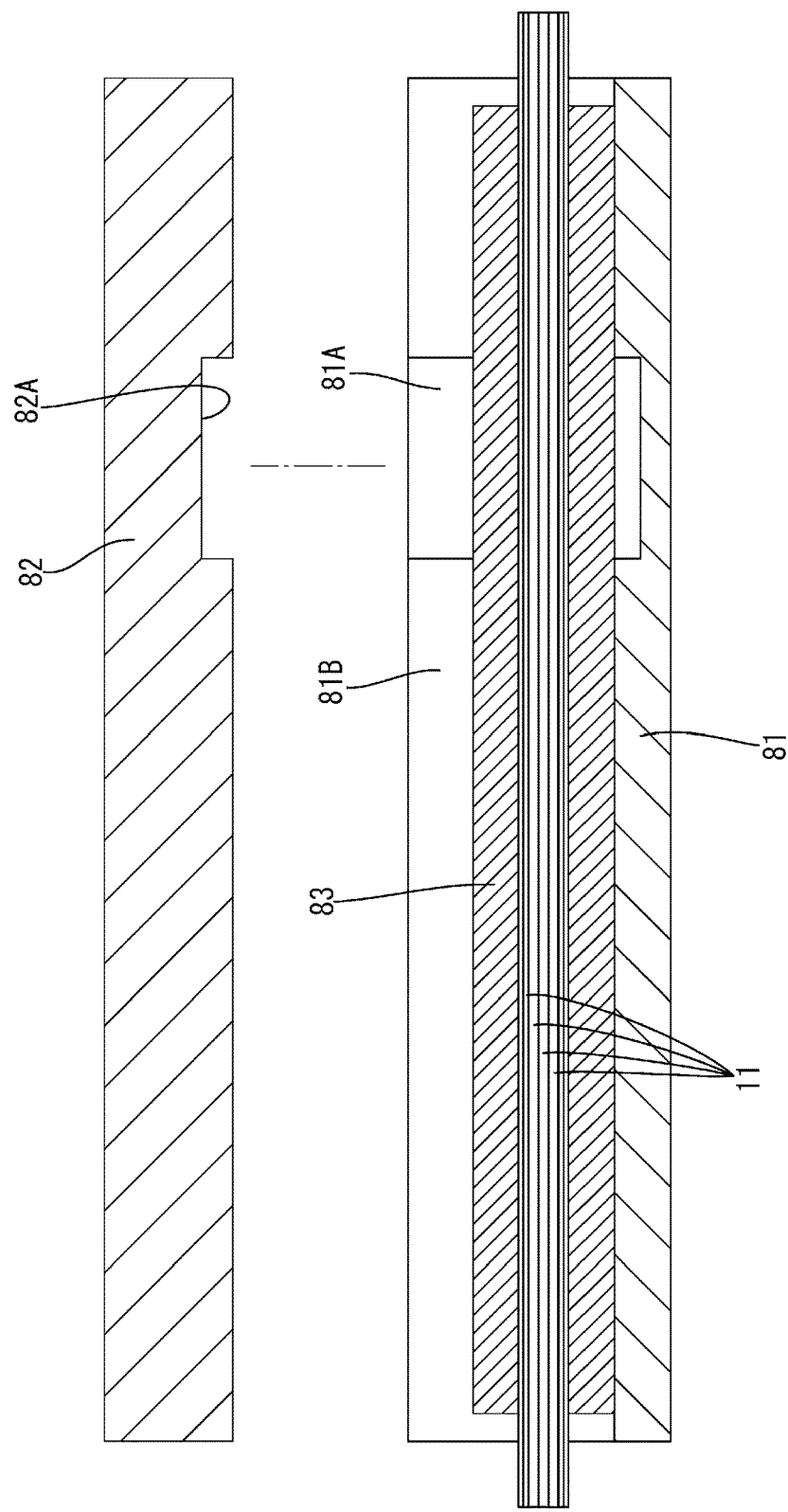
FIG. 25 is a longitudinal cross-sectional view of FIG. 24.

The tubular portion 72 is formed as follows. As shown in FIGS. 24 and 25, the plurality of electric wires 11 surrounded by a resin cloth 83 is accommodated in a groove 81B in a lower mold 81 of a metal mold in which recessed portions 81A corresponding to the soft portion 75 are formed, and then the resin cloth 83 is compressed by fitting an upper mold 82 in which a recessed portion 82A is formed into the lower mold 81. The hard portions 73 are thus formed. Meanwhile, the resin cloth 83 is not compressed at the positions of the recessed portions 81A and 82A, and the soft portion 75 is thus formed. It should be noted that the cover portion 76 and the opening portion 74 may also be formed prior to the compression or formed through cutting after the compression.

Since the plurality of connectors 77A, 77B, and 77C are located on the lateral portion of the tubular portion 72, when the tubular portion 72 has an elongate shape and is hard, it is not easy to perform the task of fitting and removing the connectors 77A, 77B, and 77C. With Embodiment 4, the soft portion 75 and the hard portions 73, which are harder than the soft portion 75, are provided at different positions in the extension direction of the tubular portion 72, and therefore, the hard portions 73 of the tubular portion 72 protect the electric wires 11 from the outside due to their hardness, and a channel in the tubular portion 72 can be bent at the soft portion 75 of the tubular portion 72. As a result, even when the hard portions 73 have an elongate shape, the hard portions 73 can be rotated using the soft portion 75 as a pivot due to the deformation of the soft portion 75 (FIG. 21), and therefore, the workability can be improved when the connectors 77A, 77B, and 77C are fitted and removed, compared with a case where the entire tubular portion 72 is constituted by the hard portion.

Embodiment 5

Embodiment 5 will be described with reference to FIGS. 26 and 27. In the following description, the same constituent elements as those of the above embodiments are denoted by the same reference numerals, and their further description is omitted.

Figure 26:
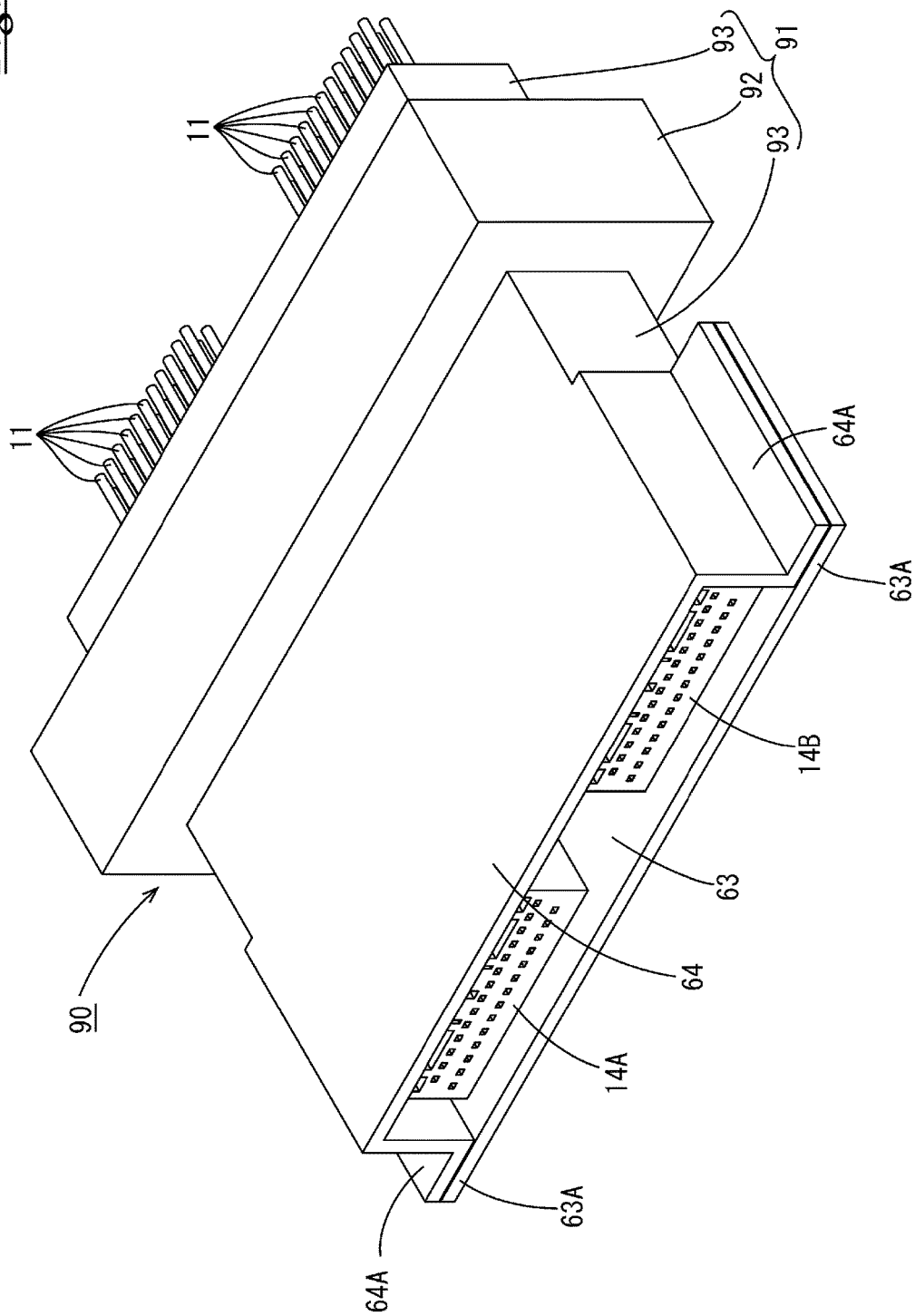
FIG. 26 is a perspective view of a sheathed wire harness of Embodiment 5.
Figure 27:
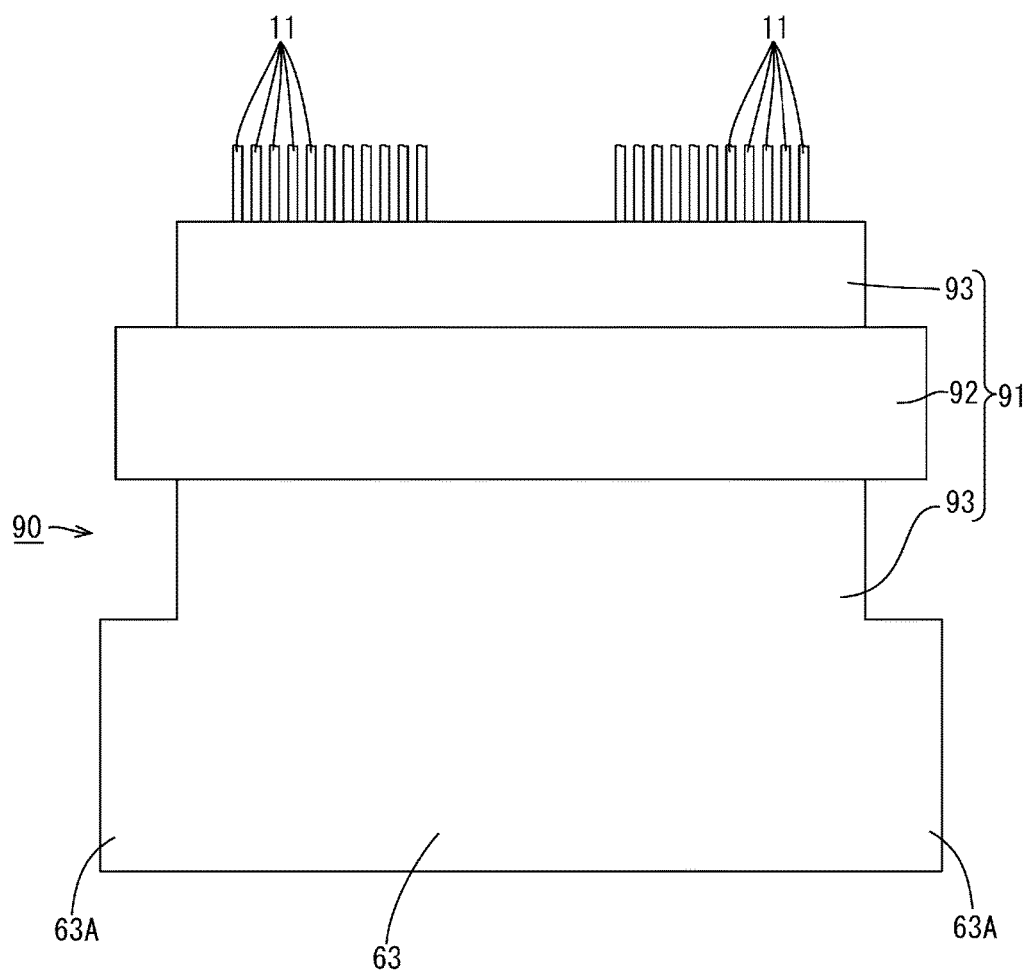
FIG. 27 is a bottom view of the sheathed wire harness.

As shown in FIG. 26, in Embodiment 5, a sheathed wire harness 90 is formed by providing a soft portion 92 in the sheathed wire harness 60 of Embodiment 3. A resin cloth 91 of the sheathed wire harness 90 is provided with the soft portion 92 having bendability (flexibility), and a portion of the resin cloth 91 other than the soft portion 92 is formed into a hard portion 93 that is harder than the soft portion 92 through compression. The hard portion 93 can be vertically rotated using the soft portion 92 as a pivot due to the bendability (flexibility) of the soft portion 92.

Other Embodiments

The present invention is not limited to the embodiments that have been described above with reference to the drawings, and embodiments such as those described below are also included in the technical scope of the present invention, for example.

Configurations for holding the cover portions 26, 64, and 76 in the closed positions are not limited to the configurations of the above embodiments. For example, the cover portions 26, 64, and 76 each may be held in the closed position by providing a claw-shaped locking portion that is integrally or separately formed on one of the holding portion and the held portion, and released therefrom. The cover portions 26, 64, and 76 are not limited to those to be locked to the resin cloths 20, 61, 71, and 91. For example, the cover portion 26 may be locked to the connector 14A, 14B, 77A, 77B, 77C, or the like, and thus held in the closed position.

The open positions of the cover portions 26, 64, and 76 are not limited to the positions shown in the above embodiments. It is sufficient if at least portions of the electric wires 11 near the connector 14A, 14B, 77A, 77B, or 77C are exposed. Positions at which the cover portions 26, 64, and 76 extend at angles that are different from those shown in the above embodiments may be taken as the open positions.

The end portions of each of the resin cloths 20, 61, 71, and 91 in the folded-back direction are fastened together through ultrasonic welding, but there is no limitation thereto. Welding other than ultrasonic welding, such as heat welding in which a heating plate using a heater is directly pressed to a member, may also be used. There is no limitation to welding, and a stapler that bends a U-shaped needle inward from both sides and thus performs stapling may be used as well.

The sheathed wire harnesses 10, 60, 70, and 90 are each connected to the ECU 40 or 78, but there is no limitation thereto. The sheathed wire harness may also be connected to a device or the like other than an ECU, for example.

The sheathed wire harnesses 10, 60, 70, and 90 each may be provided with a shielding layer for shielding the plurality of electric wires 11. For example, a shielding layer made of a metal foil, plating, or the like is formed on the inner surface of the resin cloth 20.

The number of the electric wires 11 is not limited to seven as mentioned above, and the different number of electric wires may be used. For example, a single electric wire 11 may also be used.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10, 60, 70, 90: Sheathed wire harness
11: Electric wire
14A, 14B, 77A, 77B, 77C: Connector
20, 61, 71, 91: Resin cloth
21, 62, 72: Tubular portion
24, 63: Extending portion
25, 52: Holding portion
26, 64, 76: Cover portion
27, 53: Held portion
29A, 29B: Hook-and-loop fastener
30: Overlap portion
41A, 41B, 79A, 79B, 79C: Device-connector (counterpart connector)
73: Soft portion
75: Hard portion

The invention claimed is:

1. A sheathed wire harness comprising:
a connector to be fitted to a counterpart connector, the connector having a front side connectable to the counterpart connector and a rear side;
an electric wire connected to the connector at the rear side thereof; and
a fibrous resin cloth for surrounding the electric wire,
wherein the resin cloth includes a cover portion that can be moved to a closed position in which a portion of the electric wire on the rear side of the connector is covered, and to an open position in which the portion of the electric wire on the rear side of the connector is exposed, and
the cover portion covers both the portion of the electric wire on the rear side of the connector as well as the rear side of the connector in a state in which the connector is fitted to the counterpart connector.

2. The sheathed wire harness according to claim 1, wherein the resin cloth includes a holding portion with which the cover portion can be held in the closed position and released therefrom.

3. The sheathed wire harness according to claim 2, wherein the cover portion includes a held portion to be held by the holding portion, and the holding portion and the held portion both have flexibility.

4. The sheathed wire harness according to claim 1, wherein the resin cloth includes:
a tubular portion for surrounding the electric wire; and
an extending portion that extends from the tubular portion toward the connector and is configured to cover a portion of the electric wire that is not covered with the cover portion, and
the cover portion is continuous with a lateral side of the extending portion relative to a direction in which the extending portion extends.

5. The sheathed wire harness according to claim 1, wherein the cover portion includes an overlap portion that overlaps the resin cloth when the cover portion is in the closed position.

6. The sheathed wire harness according to claim 1, wherein the cover portion extends to a position at which the entirety of the connector is covered.

7. The sheathed wire harness according to claim 1,
wherein the resin cloth includes a tubular portion for surrounding the electric wire, and
a soft portion and a hard portion that is harder than the soft portion are provided at different positions of the tubular portion in a direction in which the tubular portion extends.

* * * * *